(12) United States Patent
Kato et al.

(10) Patent No.: US 8,650,420 B2
(45) Date of Patent: Feb. 11, 2014

(54) OPERATIONAL MANAGEMENT METHOD FOR INFORMATION PROCESSING SYSTEM AND INFORMATION PROCESSING SYSTEM

(75) Inventors: Takeshi Kato, Akishima (JP); Tatsuya Saito, Kunitachi (JP); Jun Okitsu, Yokohama (JP); Yoko Shiga, Yokohama (JP); Tadakatsu Nakajima, Kasumigaura (JP); Yoshihiro Kondo, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 111 days.

(21) Appl. No.: 13/395,070

(22) PCT Filed: Sep. 9, 2009

(86) PCT No.: PCT/JP2009/066048
§ 371 (c)(1),
(2), (4) Date: Apr. 18, 2012

(87) PCT Pub. No.: WO2011/030469
PCT Pub. Date: Mar. 17, 2011

(65) Prior Publication Data
US 2012/0198253 A1    Aug. 2, 2012

(51) Int. Cl.
*G06F 1/26* (2006.01)
(52) U.S. Cl.
USPC ........... 713/320; 700/277; 700/297; 713/340; 718/104
(58) Field of Classification Search
USPC .................. 700/277, 297; 713/300, 320, 340; 718/104
See application file for complete search history.

(56) References Cited

U.S. PATENT DOCUMENTS

| | | | |
|---|---|---|---|
| 7,363,516 B2 | 4/2008 | Bresniker et al. | |
| 7,373,268 B1 | 5/2008 | Viredaz et al. | |
| 8,346,398 B2 * | 1/2013 | Ahmed et al. | 700/278 |
| 2002/0062454 A1 | 5/2002 | Fung | |
| 2006/0168975 A1 | 8/2006 | Malone et al. | |

(Continued)

FOREIGN PATENT DOCUMENTS

| | | |
|---|---|---|
| GB | 2 406 677 A | 4/2005 |
| JP | 2005-115941 A | 4/2005 |

(Continued)

OTHER PUBLICATIONS

International Search Report dated Dec. 1, 2009 including partial English-language translation (Four (4) pages).
PCT/ISA/237 (Four (4) pages).
European Search Report dated Jan. 22, 2013 (Five (5) pages).

*Primary Examiner* — Albert Wang
(74) *Attorney, Agent, or Firm* — Crowell & Moring LLP

(57) ABSTRACT

In an information processing system comprising an information processing equipment group and a facility equipment group, both an increase in performance and a reduction in power consumption are obtained, thereby achieving an efficient and flexible operational management. The plurality of information processing equipments are divided into a plurality of groups, each of which includes power feed equipments and cooling equipments. The operation management method for the information processing system includes: a procedure for acquiring, from each of the groups, operating information indicating the performances and the power consumptions of the information processing equipments, the power feed equipments, and the cooling equipments included in each of the groups; and another procedure for controlling, based on the operating information, the information processing equipments, the power feed equipments, and the cooling equipments included in each of the groups so that the performances with respect to the power consumptions become large.

14 Claims, 22 Drawing Sheets

(56) References Cited

U.S. PATENT DOCUMENTS

2006/0282687 A1 12/2006 Bahali et al.
2007/0260417 A1 11/2007 Starmer et al.
2007/0271475 A1 11/2007 Hatasaki et al.
2009/0006873 A1 1/2009 Bellofatto et al.

FOREIGN PATENT DOCUMENTS

| JP | 2005-312142 A | 11/2005 |
| JP | 2006-208000 A | 8/2006 |
| JP | 2007-310791 A | 11/2007 |
| JP | 2009-193247 A | 8/2009 |

* cited by examiner

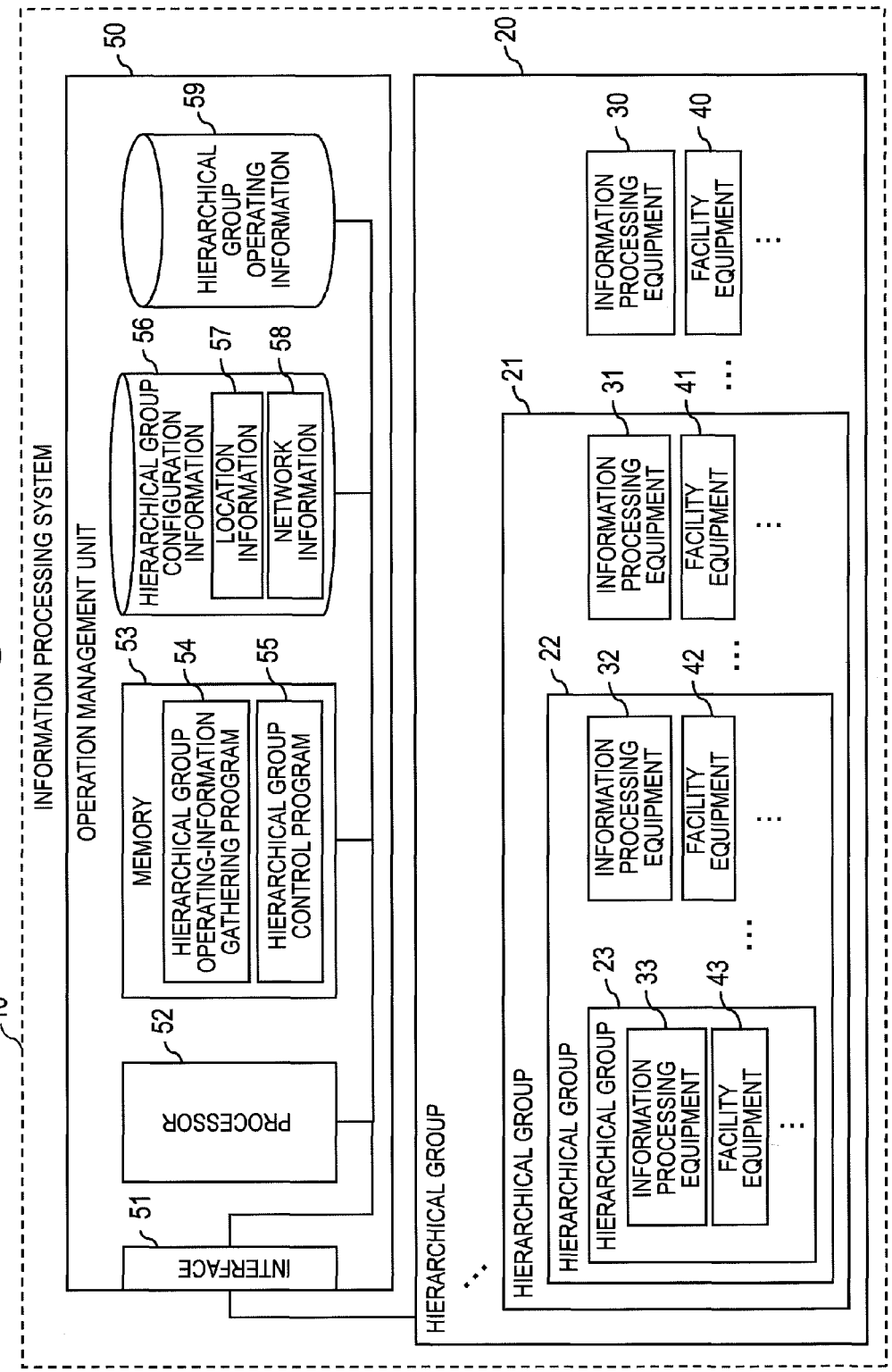

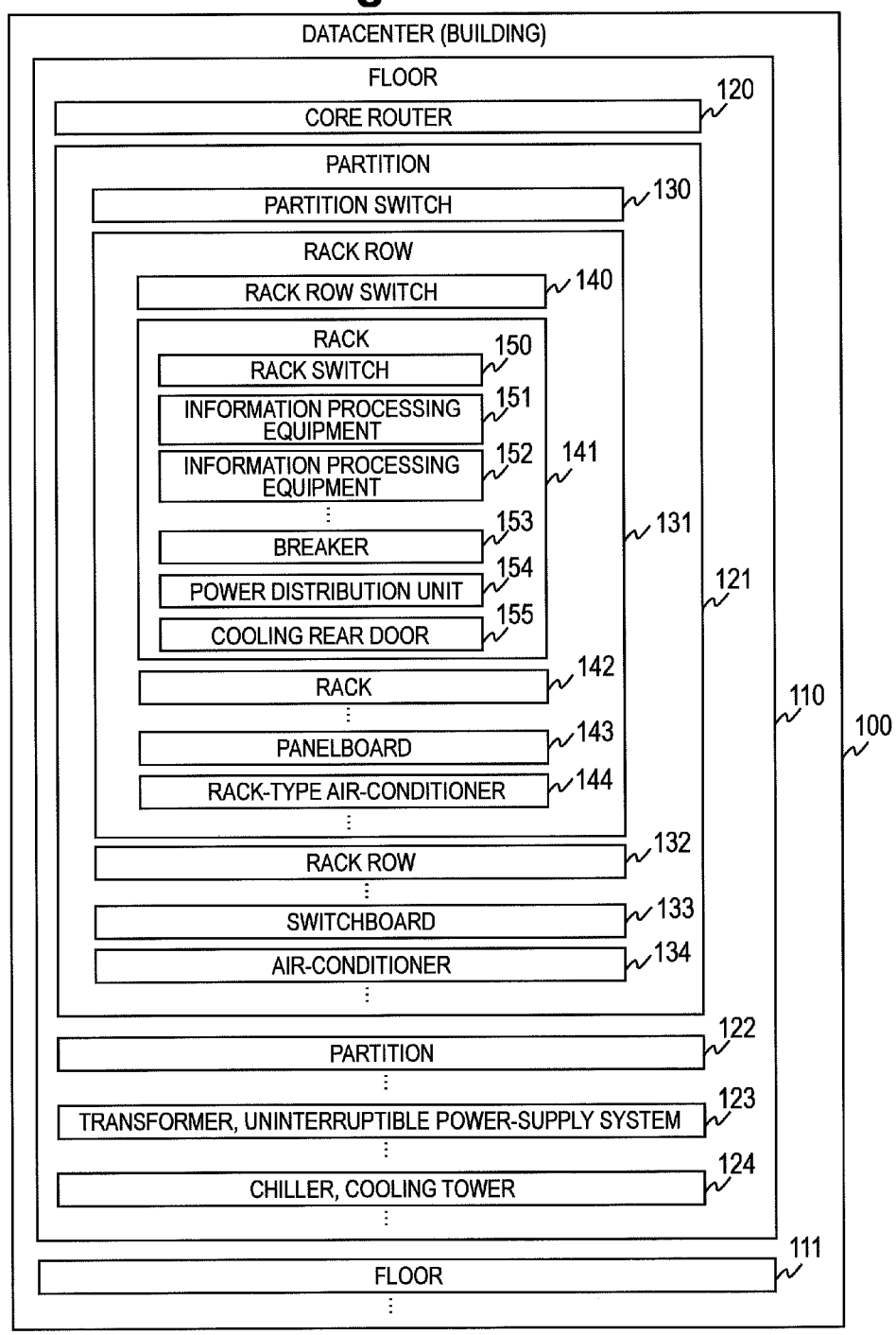

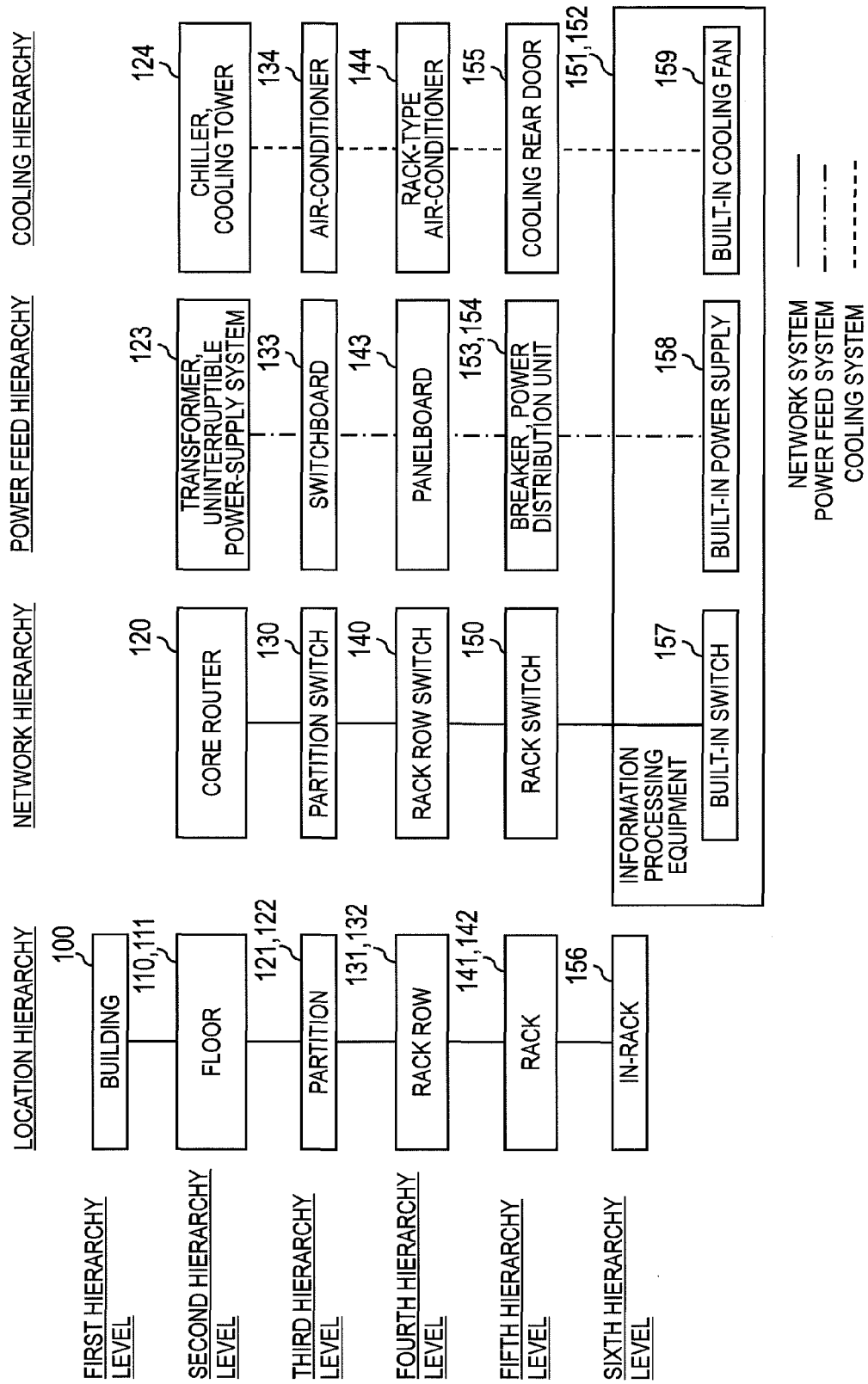

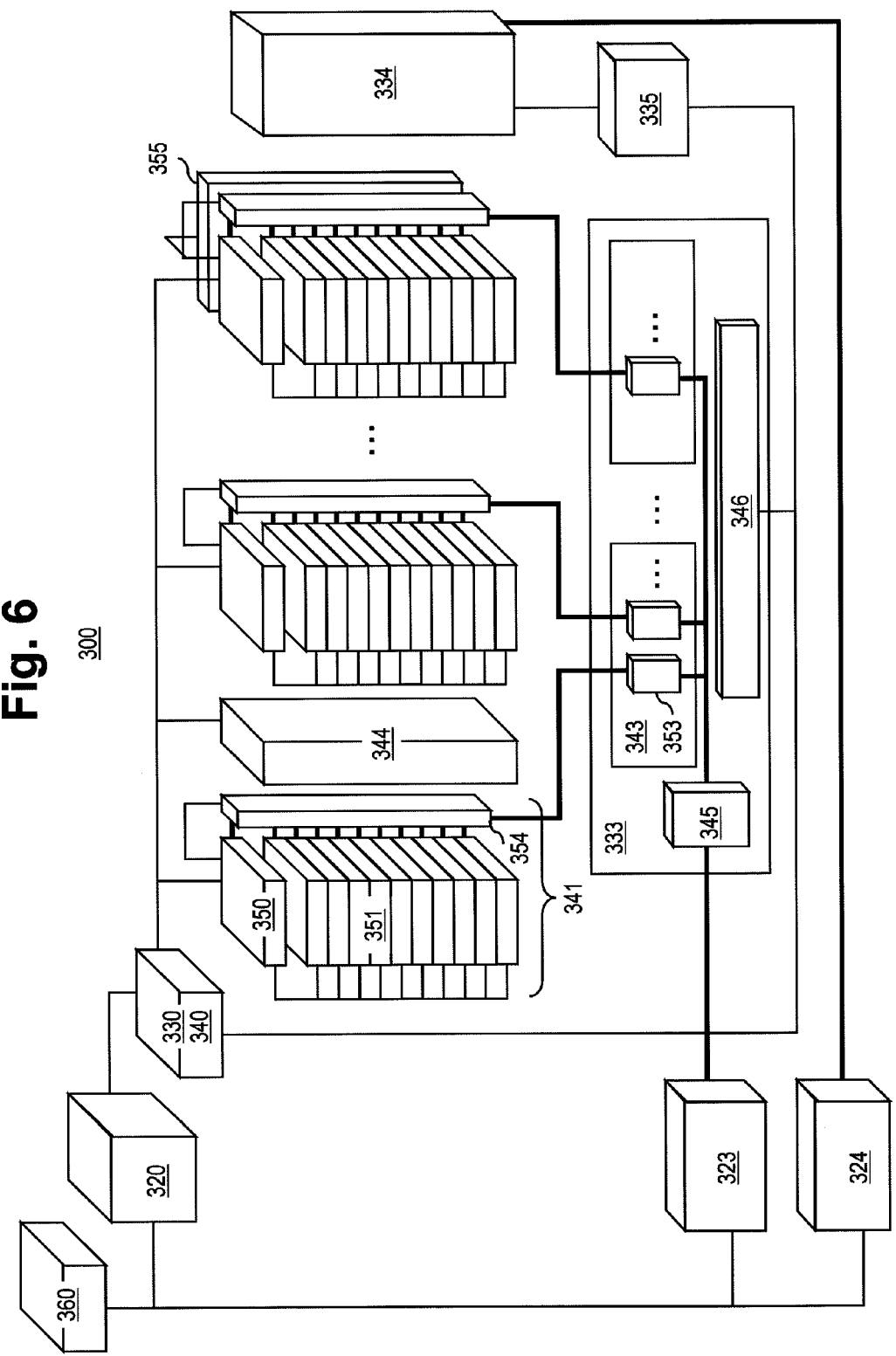

Fig. 8

HIERARCHICAL GROUP CONFIGURATION INFORMATION TABLE 501

| EQUIPMENT ID 5011 | EQUIPMENT NAME 5012 | HIERARCHICAL GROUP ID 5013 | DIRECT-LINE UPPER ORDER 1 5014 | DIRECT-LINE UPPER ORDER 2 5015 | .. | OTHER-LINE 1 5016 | .. | OTHER-LINE 2 5017 | .. |
|---|---|---|---|---|---|---|---|---|---|
| XXXX | BUILDING | ZZ_100000_0 | | | | | | | |
| XXXX | FLOOR | ZZ_130000_0 | | | | | | | |
| XXXX | PARTITION | ZZ_132000_0 | | | | | | | |
| XXXX | RACK ROW | ZZ_132100_0 | | | | | | | |
| XXXX | RACK | ZZ_132150_0 | | | | | | | |
| XXXX | SERVER | SV_132152_0 | NW_132150_1 | NW_132150_2 | | PD_132150_2 | | CL_132150_1 | |
| XXXX | STORAGE | ST_132152_0 | NW_132150_3 | NW_132150_4 | | PD_132150_1 | | CL_132150_1 | |
| XXXX | CORE ROUTER | NW_130000_1 | | | | FD_135100_1 | | CL_135100_1 | |
| XXXX | PARTITION SWITCH | NW_132000_1 | NW_130000_1 | | | FD_132100_1 | | CL_132100_3 | |
| XXXX | RACK ROW SWITCH | NW_132100_1 | NW_132000_1 | | | FD_132000_1 | | CL_132100_3 | |
| XXXX | RACK SWITCH | NW_132150_2 | NW_132100_1 | | | PD_132150_2 | | CL_132150_1 | |
| XXXX | UNINTERRUPTIBLE POWER-SUPPLY SYSTEM | FD_130000_1 | | | | | | | |
| XXXX | SWITCHBOARD | FD_132000_1 | FD_130000_1 | | | | | | |
| XXXX | PANELBOARD | FD_132100_1 | FD_132000_1 | | | | | | |
| XXXX | BREAKER | FD_132150_2 | FD_132100_1 | | | | | | |
| XXXX | POWER DISTRIBUTION UNIT | PD_132150_2 | FD_132150_2 | | | | | | |
| XXXX | CHILLER | CL_130000_1 | | | | | | | |
| XXXX | AIR-CONDITIONER | CL_132000_1 | CL_130000_1 | | | | | | |
| XXXX | RACK-TYPE AIR-CONDITIONER | CL_132100_2 | CL_132100_1 | CL_132000_2 | | FD_132000_2 | | | |
| XXXX | COOLING REAR DOOR | CL_132150_1 | CL_132100_2 | CL_132000_3 | | FD_132100_2 | | | |

Fig. 9A

INFORMATION PROCESSING EQUIPMENT
HIERARCHICAL GROUP OPERATING INFORMATION 502

| EQUIPMENT ID 5021 | EQUIPMENT NAME 5022 | HIERARCHICAL GROUP ID 5023 | MAXIMUM CPU RESOURCE UTILIZATION 5024 | CPU RESOURCE UTILIZATION 5025 | ... | POWER CONSUMPTION 5026 | ... | PERFORMANCE-TO-POWER EFFICIENCY 5027 |
|---|---|---|---|---|---|---|---|---|
| xxxx | BUILDING | ZZ_100000_0 | | | | | | |
| xxxx | FLOOR | ZZ_130000_0 | | | | | | |
| xxxx | PARTITION | ZZ_132000_0 | ξ | η | | σ | | a |
| xxxx | RACK ROW | ZZ_132100_0 | | | | | | |
| xxxx | RACK | ZZ_132150_0 | | | | | | |
| xxxx | SERVER | SV_132152_0 | | | | | | |
| xxxx | WORKLOAD | VM_xxxxxxxx | | | | | | |

Fig. 9B

NETWORK EQUIPMENT HIERARCHICAL GROUP OPERATING INFORMATION 503

| EQUIPMENT ID 5031 | EQUIPMENT NAME 5032 | HIERARCHICAL GROUP ID 5033 | MAXIMUM NW RESOURCE UTILIZATION 5034 | NW RESOURCE UTILIZATION 5035 | ... | POWER CONSUMPTION 5036 | ... | PERFORMANCE-TO-POWER EFFICIENCY 5037 |
|---|---|---|---|---|---|---|---|---|
| xxxx | CORE ROUTER | NW_130000_1 | | | | | | |
| xxxx | PARTITION SWITCH | NW_132000_1 | ζ | ν | | | | b |
| xxxx | RACK ROW SWITCH | NW_132100_1 | | | | | | |
| xxxx | RACK SWITCH | NW_132150_2 | | | | | | |

Fig. 9C

POWER FEEDING FACILITY EQUIPMENT HIERARCHICAL GROUP OPERATING INFORMATION 504

| EQUIPMENT ID 5041 | EQUIPMENT NAME 5042 | HIERARCHICAL GROUP ID 5043 | MAXIMUM POWER CAPACITY 5044 | POWER CAPACITY 5045 | ... | FEEDING LOSS 5046 | POWER SENSITIVITY (1/(CONVERSION EFFICIENCY)−1) 5047 | ... |
|---|---|---|---|---|---|---|---|---|
| XXXX | UNINTERRUPTIBLE POWER-SUPPLY SYSTEM | FD_130000_1 | | | | | | |
| XXXX | SWITCHBOARD | FD_132000_1 | β | | | φ | ε | |
| XXXX | PANELBOARD | FD_132100_1 | | | | | | |
| XXXX | BREAKER | FD_132150_2 | | | | | | |
| XXXX | POWER DISTRIBUTION UNIT | PD_132150_2 | | | | | | |

Fig. 9D

COOLING FACILITY EQUIPMENT HIERARCHICAL GROUP OPERATING INFORMATION 505

| EQUIPMENT ID 5051 | EQUIPMENT NAME 5052 | HIERARCHICAL GROUP ID 5053 | MAXIMUM COOLING CAPACITY 5054 | COOLING CAPACITY 5055 | ... | COOLING POWER 5056 | POWER SENSITIVITY (1/(COEFFICIENT OF PERFORMANCE)) 5057 | ... |
|---|---|---|---|---|---|---|---|---|
| XXXX | CHILLER | CL_130000_1 | | | | | | |
| XXXX | AIR-CONDITIONER | CL_132000_1 | γ | | | ψ | σ | |
| XXXX | RACK-TYPE AIR-CONDITIONER | CL_132100_2 | | | | | | |
| XXXX | COOLING REAR DOOR | CL_132150_1 | | | | | | |

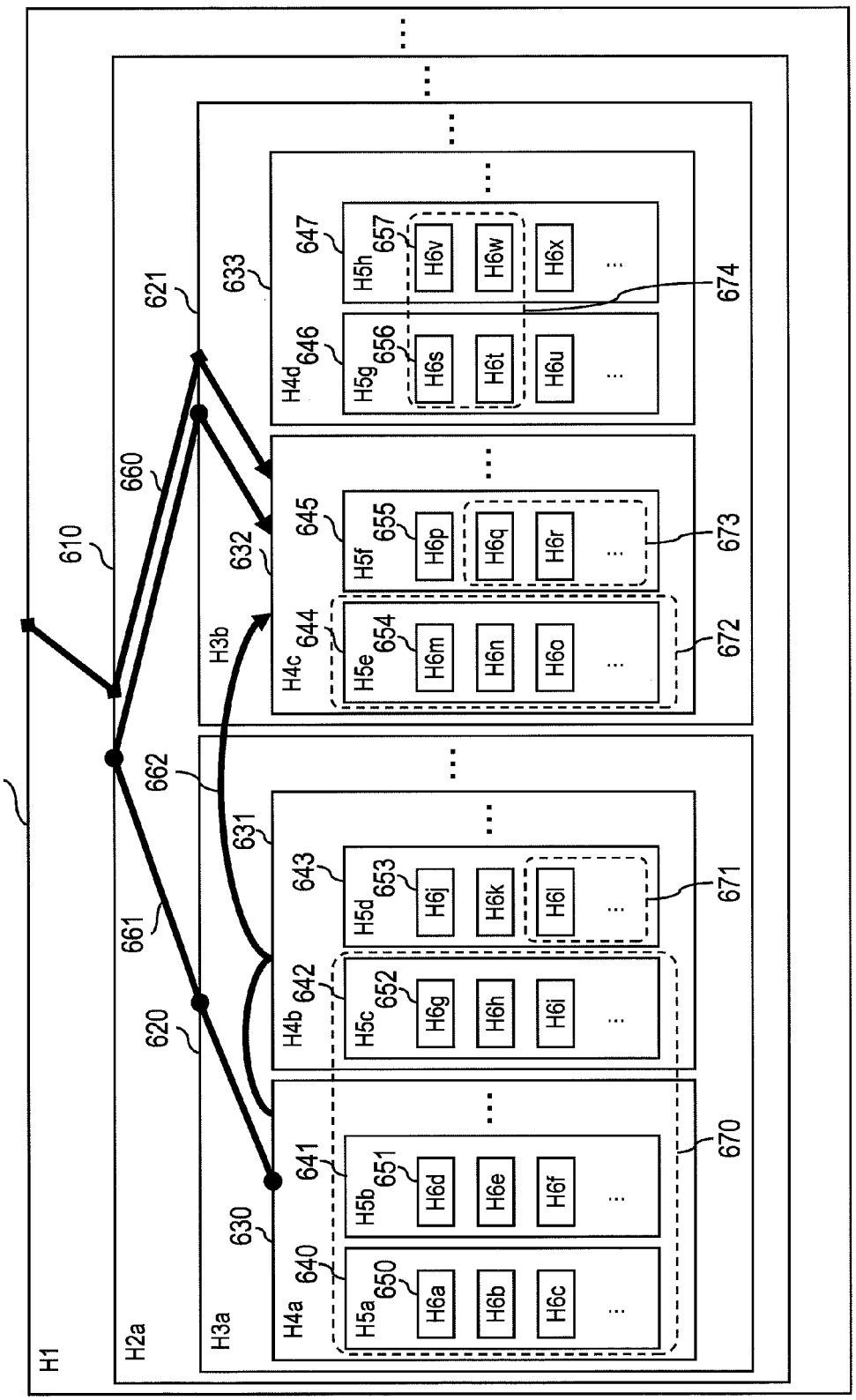

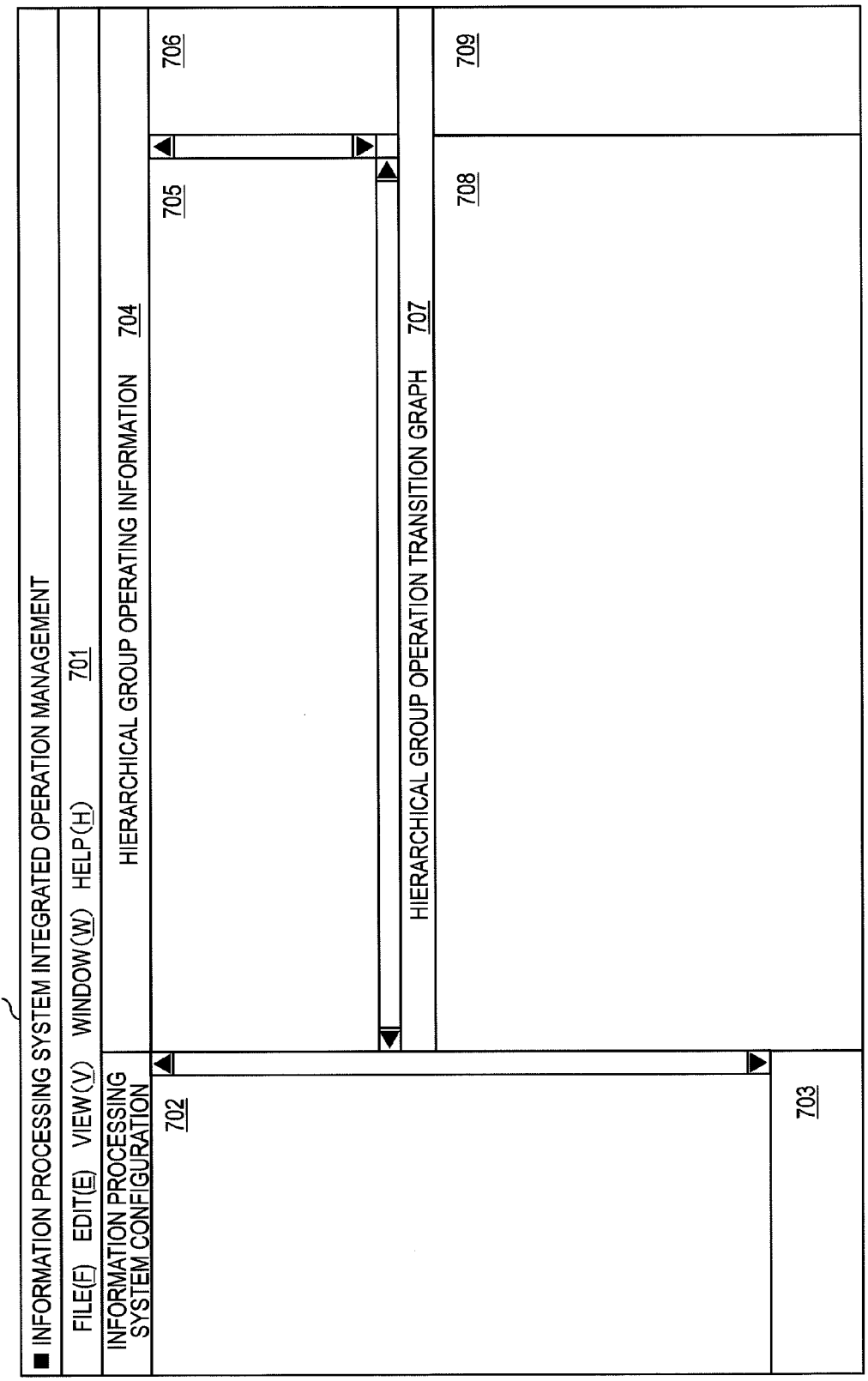

Fig. 14C

HIERARCHICAL GROUP OPERATING INFORMATION 704

PRESENT VALUE 2009.08.05 17:11   TIME RANGE HISTORY -00:00 PREDICTION +00:00

| HIERARCHICAL GROUPS | CPU UTILIZATION (GHz) | CPU UTILIZATION (%) | MEMORY UTILIZATION (%) | IT POWER CONSUMPTION (kW) | FACILITY EQUIPMENT POWER CONSUMPTION (kW) | PERFORMANCE-TO-POWER EFFICIENCY (GHz/kW) |
|---|---|---|---|---|---|---|
| RACK 1 | 84.8 | 29.4 | 24.6 | 3.46 | 1.91 | 15.8 |
| RACK 2 | 94.6 | 32.8 | 28.5 | 3.99 | 2.60 | 14.4 |

705

▶ ITEM SELECTION
▶ TIME SELECTION

706

OPERATIONAL MANAGEMENT METHOD FOR INFORMATION PROCESSING SYSTEM AND INFORMATION PROCESSING SYSTEM

BACKGROUND OF THE INVENTION

This invention relates to an operation management method for an information processing system including information processing equipment, which includes a server, storage, a network, and the like, and facility equipment, which supplies power to and cools the information processing equipment, and more particularly, to a method suitable for integrated power saving and efficient operation management of the information processing equipment and the facility equipment.

In a computer system of US 2009/0006873 A1, the power consumption or ambient temperature of processors, gate arrays, or other types of power consumption equipment is measured with many sensors, the measurement data is collected in a system control computer over a control network which is constituted of a control device, nodes, and links, and the system control computer sends control signals to actuators of the power consumption equipment to control the power consumption of the power consumption equipment in a manner that maximizes the equipment's performance within the environmental limitations of the room, i.e., allowable power, temperature conditions, and the like.

In a datacenter of US 2007/0260417 A1, the temperatures of server racks are measured with sensors attached to the racks to be collected in a spatial temperature distribution controller and, when the temperature of one of the racks exceeds standards, a virtual machine is moved to a rack whose temperature is within the standards to adjust an air-conditioner, local cooling equipment, power supply output, and processor speed in a manner that keeps the temperature of the rack within the standards.

JP 2005-312142 A is directed to a system for managing rack equipment at a datacenter or the like in which rack equipment such as servers and disk arrays is connected by a communication link to a management control component provided for each rack, information on the rack equipment is collected in a master management control center via the component, and the operating settings and performance levels of the rack equipment are adjusted based on management policies about power consumption and thermal load to control air-conditioners, auxiliary power supplies, and the like.

In JP 2005-115941 A, a system for managing the power consumption of a building is configured to: measure, with a power meter of a switchboard, power consumption for each floor of the building, for each department unit on a floor, or for each type of equipment such as information equipment, air-conditioning equipment, and lighting fixtures; collect the measurement information in a central monitoring device to display in the form of a graph; and alert the administrator when power consumption exceeds a threshold.

SUMMARY OF THE INVENTION

With the development of cloud computing, datacenter businesses are rapidly expanding as an information processing infrastructure that supports cloud computing at the back end. Datacenters are on one hand demanded to improve greatly in information processing performance for enhanced sophistication and diversity of cloud services and, on the other hand, are in serious need to reduce power consumption significantly for the prevention of global warming. Balancing the conflicting goals of performance enhancement and power saving is thus an important issue for datacenters.

An information processing system constituting a datacenter includes information processing equipment, which includes a server, storage, a network, and the like, power feeding facility equipment, which includes a transformer, an uninterruptible power-supply system, a switchboard, a panelboard, and the like to supply power to the information processing equipment, and a cooling facility equipment, which includes a chiller, an air-conditioner, local cooling equipment, an air supply/exhaust opening, and the like to cool the information processing equipment. Efforts to balance performance enhancement and power saving include, for example, an improvement of processing performance relative to power consumption in the information processing equipment by switching operating states to suit the workload or by virtualized consolidation of the workload, an improvement of conversion efficiency in the power feeding facility equipment by switching power supplies to suit the power load of the information processing equipment, and an improvement of the coefficient of performance in the cooling facility equipment by setting running condition settings that are suited to the thermal load of the information processing equipment.

These efforts are conventionally made in the information processing equipment and in the facility equipment independently of each other. However, service sophistication has turned a datacenter into a mixed system of various types of information processing equipment and various types of facility equipment for supporting the information processing equipment, and the operation management of the two is becoming increasingly complicate. To build an information processing resource pool that has flexibility and adaptability for sophisticated and diverse services of the future and realize operation management that balances performance enhancement and power saving, integrated architecture and operation management method for an information processing system are sought in which the information processing equipment and the facility equipment cooperate with each other.

The facility equipment is generally designed based on the maximum rated power of the information processing equipment, but the feeding loss and cooling power of the actually running facility equipment depend greatly on the power consumption distribution of the information processing equipment and on changes with time of the power consumption distribution. For example, the conversion efficiency of a power supply is dependent on the power load, and power supply dissipation therefore varies depending on the power consumption of the information processing equipment, what power feed system is used, and the like. An air-conditioner, too, has a coefficient of performance dependent on the thermal load, and air conditioning power is therefore influenced by the heat generation distribution of the information processing equipment, the positional relation between the air-conditioner and the information processing equipment, air flow, temperature, heat capacity, thermal time constant, and the like. Power consumed by the facility equipment which supplies power to and cools the information processing equipment takes up a large proportion of power consumption at a datacenter in addition to power consumed by the information processing equipment. Accordingly, in order to advance overall power saving combining the two at a datacenter, efficient operation management is necessary which establishes cooperation between the information processing equipment and the facility equipment by thoroughly considering the power consumption distribution of the information processing equipment and changes thereof with time.

From the above, in order to improve the flexibility and operation efficiency of the information processing system, it is desirable to give simple and scalable architecture to the information processing equipment and the facility equipment and, furthermore, to conform the operation management systems of the two to each other for cooperative operation management. As a forerunner of this, modular datacenters, in which the information processing equipment and the facility equipment are built on a module-by-module basis, and top-of-rack network architecture, in which servers and a network are targets and servers in racks are integrated via a switch provided for each rack, are gaining popularity. There are several known examples of operation management methods related to the power consumption and temperature of an information processing system or a building. However, those known examples deal with only an aspect of the comprehensive standpoint described above which involves performance enhancement coupled with power saving and cooperation between the information processing equipment and the facility equipment, and do not pay due consideration to, for example, cooperation between modules, cooperation between a module and the outside of the module, and the relation between a network system and a facility equipment system.

To give a representative known example, in US 2009/0006873 A1, the power consumption of power consumption equipment constituting the computer system is controlled via the control network by the system control computer. The document, however, describes neither the relation between an information processing network and the control network nor control of the power feeding facility equipment and the cooling facility equipment which provide an interior environment. In addition, while each individual component of power consumption equipment is controlled by an actuator, the document does not discuss how specifically the power consumption equipment as a group improves the system processing performance relative to power consumption.

In US 2007-0260417 A1, the temperatures of the server racks at the datacenter are monitored with the sensor provided for each rack, and the spatial temperature distribution controller controls the virtual machine, processor speed, the air-conditioners, the local cooling equipment, the power supply, and the like. Operation management systems match between the controller and the virtual machine, processor speed, the local cooling equipment, and the power supply, but the document does not include a concrete description on how racks are ranked to be selected as the relocation destination of the virtual machine by taking into consideration the placement of the facility equipment throughout the entire floor of the datacenter, and on how running conditions of the air-conditioners and the local cooling equipment of the racks are set for integrated power saving by taking into consideration the temperature distribution and power consumption distribution of the racks on the floor.

In JP 2005-312142 A, the power consumption and thermal load of the racks are monitored by the management control component provided for each rack, and the master management control center controls, based on management policies, the operating settings and performance levels of rack equipment, and controls air-conditioners and auxiliary power supplies. Operation management systems for operation application software of the rack equipment and for power consumption or thermal load match between the components of the racks and the center. However, the document does not examine how to arrange workload or set operating settings by rank while taking into consideration the placement of air-conditioners throughout the racks, nor how to control air-conditioners and auxiliary power supplies in a manner that accomplishes integrated power saving by taking into consideration the power consumption distribution and thermal load distribution of the racks.

In JP 2005-115941 A, a power meter of a switchboard is used to monitor power consumption for each floor of the building, for each department unit, and for each equipment type, and the central monitoring device displays a graph and issues an alert. Power consumption is measured by a breaker of each switchboard, and hence the power consumption of each equipment component beyond the breaker can only be speculated, which gives rise to a problem in that a change in equipment configuration cannot be accommodated. In addition, the document does not describe a concrete method for controlling the information equipment and the air-conditioning equipment in response to the alert.

As described above, none of prior art considers integrated operation running of various types of information processing equipment, integrated control of the running of various types of facility equipment, and cooperation between information processing equipment and facility equipment. Another problem is that, while a datacenter or an entire floor is managed in a lump, total optimization is not efficient in a mixed environment of various types of equipment. One of objects of this invention is therefore to balance performance enhancement and power saving by taking into consideration conformation and cooperation between operation systems of information processing equipment and facility equipment to which flexible and scalable architecture such as a modular datacenter or a top-of-rack network is applied, and thus improving the overall operation efficiency of the datacenter. To summarize, this invention provides an operation management method that has flexibility for sophisticated and diverse services and simultaneously improves operation efficiency by partially optimizing, for each scalable configuration unit separately, workload allocation to the information processing equipment that takes a facility equipment placement system into consideration and facility equipment control that takes into consideration changes in the power consumption distribution of the information processing equipment.

A typical embodiment of this invention is an operation management method for an information processing system, the information processing system comprising: a plurality of information processing equipment components; a plurality of power feed equipment components for supplying power to the plurality of information processing equipment components; and a plurality of cooling equipment components for cooling the plurality of information processing equipment components, the plurality of information processing equipment components including a plurality of network equipment components, the plurality of information processing equipment components other than the plurality of network equipment components each comprising an interface, which is connected to one of the plurality of network equipment components, a processor, which is connected to the interface, and a memory, which is connected to the processor, the plurality of information processing equipment components other than the plurality of network equipment components including a management computer, the interface of the management computer being connected to the plurality of power feed equipment components and the plurality of cooling equipment components via the plurality of network equipment components, the information processing system having a plurality of groups defined therein, the plurality of groups each including at least one of the plurality of information processing equipment components, the plurality of groups each including at least one of the plurality of power feed equipment components that supply power to the information processing equipment components included in the group, and at least one of the plurality of cooling equipment components that cool the information processing equipment components included in the group, the management computer keeping, for each of the plurality of groups, configuration information which associates the information processing equipment components, the power feed equipment components, and the cooling equipment components that are included in the group with one another, the operation management method for an information processing system comprising: a first step of obtaining, by the management computer, for each of the plurality of groups separately, operating information which indicates performance and power consumption of the information processing equipment components, the power feed equipment components, and the cooling equipment components that are included in the group; and a second step of controlling, by the management computer, based on the operating information, the information processing equipment components, the power feed equipment components, and the cooling equipment components that are included in the group in a manner that enhances the performance relative to the power consumption.

To briefly describe effects obtained from this invention, an information processing system such as a datacenter can balance performance enhancement and power saving while acquiring scalable flexibility and can be improved in operation efficiency by performing the operation management of information processing equipment and the operation management of facility equipment in cooperation with each other and optimizing the operation management hierarchically.

BRIEF DESCRIPTION OF THE DRAWINGS

FIG. 1 is a system configuration diagram illustrating an operation management method for an information processing system according to a first embodiment of this invention.

FIGS. 2A and 2B are system configuration diagrams illustrating a first concrete example of the first embodiment of this invention.

FIG. 3 is an operation management hierarchy diagram of the first concrete example of the first embodiment of this invention.

FIG. 6 is a system configuration diagram illustrating a third concrete example of the first embodiment of this invention.

FIG. 8 is an explanatory diagram of a configuration information table which is kept by the information processing system of the first embodiment of this invention.

FIG. 9A is an explanatory diagram of an information processing equipment hierarchical group operating information table which is kept by the information processing system of the first embodiment of this invention.

FIG. 9B is an explanatory diagram of a network equipment hierarchical group operating information table which is kept by the information processing system of the first embodiment of this invention.

FIG. 9C is an explanatory diagram of a power feeding facility equipment hierarchical group operating information table which is kept by the information processing system of the first embodiment of this invention.

FIG. 9D is an explanatory diagram of a cooling facility equipment hierarchical group operating information table which is kept by the information processing system of the first embodiment of this invention.

FIG. 13 is a hierarchical group configuration diagram illustrating the operation management method for the information processing system according to the first embodiment of this invention.

FIGS. 14A to 14D are diagrams of a graphical user interface screen illustrating the operation management method for the information processing system according to the first embodiment of this invention.

DETAILED DESCRIPTION OF THE PREFERRED EMBODIMENTS

First Embodiment

Figure 2A:
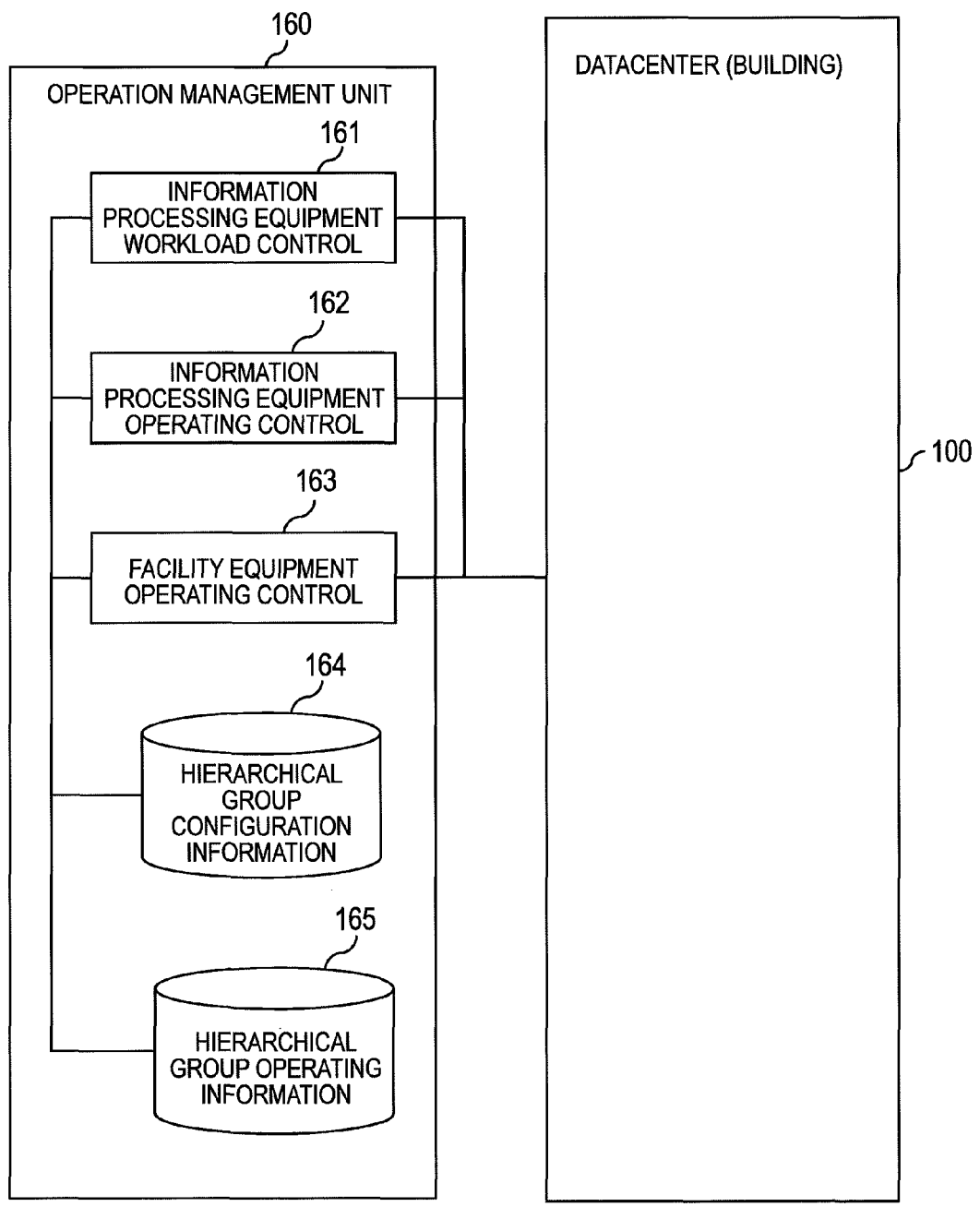

FIG. 1 is a system configuration diagram illustrating an operation management method for an information processing system according to a first embodiment of this invention.

The information processing system, denoted by 10, includes information processing equipment 30 to 33, facility equipment 40 to 43, which supply power to and cool the information processing equipment 30 to 33, and an operation management unit 50. The operation management unit 50 is a server (computer) that includes an interface 51, which is connected to the information processing equipment 30 to 33 and the facility equipment 40 to 43, a processor 52, which is connected to the interface 51, and a memory 53, which is connected to the processor 52.

The operation management unit 50 also keeps hierarchical group configuration information 56 and hierarchical group operating information 59. The hierarchical group configuration information 56 and the hierarchical group operating information 59 may be stored in storage within the operation management unit 50, for example, a magnetic disk drive (not shown in the drawing). The hierarchical group configuration information 56 includes information that indicates the configurations of hierarchical groups 20 to 23, specifically, location information 57 of the information processing equipment 30 to 33 and the facility equipment 40 to 43, and network information 58. Details of the hierarchical group configuration information 56 and the hierarchical group operating information 59 are described later with reference to FIG. 8 and FIGS. 9A to 9D.

The operation management unit 50 collects the operating information 59 for each of the hierarchical groups 20 to 23 by causing the processor 52 to execute an operating information gathering program 54, which is stored in the memory 53, and controls the information processing equipment 30 to 33 and the facility equipment 40 to 43, which belong to the hierarchical groups 20 to 23, based on the configuration information 56 and the operating information 59 by causing the processor 52 to execute a hierarchical group control program 55, which is stored in the memory 53.

Hierarchy and hierarchical groups are described now. In this embodiment, a plurality of hierarchy levels to which equipment components constituting the information processing system belong is defined. An equipment component that is a constituent of the information processing system is roughly classified as one of an information processing equipment component and a facility equipment component. For example, a server, storage, network equipment (a router and a switch), and the like are classified as information processing equipment components. The information processing equipment 30 to 33 of FIG. 1 each include these information processing equipment components. Facility equipment is classified further into one of power feed system equipment (hereinafter, also referred to as power feeding facility equipment or power feed equipment) and cooling system equipment (hereinafter, also referred to as cooling facility equipment or cooling equipment). For example, a transformer, an uninterruptible power-supply system, a switchboard, a panelboard, a power distribution unit, a breaker, and the like are classified as power feed system equipment, whereas a chiller, a cooling tower, an air-conditioner, a cooling door, and the like are classified as cooling system equipment.

In this embodiment, an information processing equipment component that is closer to an external network (not shown in the drawing) outside the information processing system 10 belongs to a higher hierarchy level. For example, in the case where a core router is connected to the external network, a switch is connected to the core router, and a server is connected to the switch, the core router belongs to the highest hierarchy level, the switch belongs to a hierarchy level below the highest hierarchy level, and the server belongs to a hierarchy level further below that level.

A component of power feed system equipment that is closer to a source of power feed belongs to a higher hierarchy level. For example, in the case where power from an uninterruptible power-supply system is supplied through a panelboard and then a breaker to a server, the uninterruptible power-supply system belongs to the highest hierarchy level, the panel board belongs to a hierarchy level below the highest hierarchy level, and the breaker belongs to a hierarchy level further below that level.

A component of cooling system equipment that is closer to a refrigerant or a source of cool air belongs to a higher hierarchy level. Alternatively, a component of cooling system equipment that has a wider cooling range may belong to a higher hierarchy level. For example, in the case where a chiller generates a refrigerant and an air-conditioner installed on a floor uses the refrigerant to cool a partition of the floor, the chiller belongs to the highest hierarchy level and the air-conditioner installed on the floor belongs to a hierarchy level below the highest hierarchy level. In the case where a small-sized air-conditioner (e.g., a rack-type air-conditioner) is further installed to cool a particular server rack (or a few particular server racks) out of a plurality of server racks disposed in the partition, the rack-type air-conditioner belongs to a hierarchy level below the hierarchy level to which the air conditioner installed on the floor belongs.

A hierarchical group which includes a plurality of equipment components is also defined in each hierarchy level in this embodiment. An administrator of the system can define hierarchical groups at his/her discretion. In this embodiment, for example, a lower-order hierarchical group which includes a plurality of servers and others connected to one switch is defined, and an upper-order hierarchical group which includes a plurality of switches connected to one core router and a plurality of lower-order hierarchical groups connected to these switches is defined as well.

In this embodiment, a component of power feed system equipment that supplies power to an information processing equipment component belonging to one hierarchical group belongs to this hierarchical group. For example, a breaker that supplies power to an information processing equipment component belonging to the lower-order hierarchical group described above (e.g., a rack of FIG. 3) belongs to this lower-order hierarchical group described above. A panelboard that supplies power to an information processing equipment component belonging to the upper-order hierarchical group described above (e.g., a rack row of FIG. 3) belongs to this upper-order hierarchical group described above.

In this embodiment, a component of cooling system equipment that cools an information processing equipment component belonging to one hierarchical group belongs to this hierarchical group. For example, a rack-type air-conditioner that cools an information processing equipment component belonging to the lower-order hierarchical group described above (e.g., a rack row of FIG. 3) belongs to this lower-order hierarchical group described above. An air-conditioner which is installed on a floor and cools an information processing equipment component belonging to the upper-order hierarchical group described above (e.g., a partition of FIG. 3) belongs to this upper-order hierarchical group described above.

Defining hierarchical groups in this manner clarifies the extent of influence resulting from controlling equipment within each hierarchical group. Particularly by, for example, configuring the information processing system so that a component of power feed system equipment belonging to one hierarchical group does not supply power to an information processing equipment component that does not belong to this hierarchical group, and further configuring the information processing system so that a component of cooling system equipment belonging to one hierarchical group does not cool an information processing equipment component that does not belong to this hierarchical group (or influence over an information processing equipment component that does not belong to this hierarchical group is sufficiently small), the extent of influence resulting from controlling an equipment component within each hierarchical group is limited to the hierarchical group. Hierarchical groups can thus be controlled independently of one another. For example, when a component of power feed system equipment belonging to one hierarchical group is controlled, the influence of this control covers an information processing equipment component within this hierarchical group (including information processing equipment components within lower-order hierarchical groups that are included in this hierarchical group), but does not extend to an information processing equipment component within another hierarchical group. This facilitates optimization performed on a hierarchical group-by-hierarchical group basis.

In an operation management method of the first embodiment, the operation management unit 50 uses the operating information gathering program 54 to communicate with the information processing equipment 30 to 33 and the facility equipment 40 to 43, and to compile operating information 59 for each of the upper-order to lower-order hierarchical groups 20 to 23 based on the hierarchical group configuration information 56, thereby executing optimization control of the information processing equipment 30 to 33 and the facility equipment 40 to 43 hierarchically. For example, the operation management unit 50 optimizes, on a hierarchical group-by-hierarchical group basis, workload allocation to information processing equipment for minimizing total power which combines power consumed by information processing equipment, and feeding loss and cooling power of facility equipment, control of the power capacity and cooling capacity of facility equipment relative to the power consumption of information processing equipment, control of the workload and processing performance of information processing equipment relative to the power capacity and cooling capacity of facility equipment, and the like. This hierarchical control provides optimization superior in convergence to total optimization, and enables the system to flexibly adapt to an addition or relocation of an information processing equipment component or a facility equipment component. The operation management unit 50 in principle controls each hierarchical group independently of other hierarchical groups but, when this does not accomplish satisfactory optimization, controls the hierarchical group through cooperation with other hierarchical groups. A procedure of the optimization control is described later with reference to FIGS. 10 to 12.

The configuration information 56 of the hierarchical groups 20 to 23 includes attribute data of the information processing equipment 30 to 33 and the facility equipment 40 to 43 regarding the hierarchical groups 20 to 23, and indicates the relation of the information processing equipment 30 to 33 and the facility equipment 40 to 43 with each other based on the location information 57 and the network information 58, and the hierarchical relation among the hierarchical groups 20 to 23. For example, as illustrated in FIG. 1, the information processing equipment 30 and the facility equipment 40 belong to the uppermost-order hierarchical group 20. The information processing equipment 33 and the facility equipment 44, on the other hand, belong to the hierarchical group 23 and also to the upper-order hierarchical groups 20 to 22. In the simplified illustration of FIG. 1, the hierarchical group 20, for example, is constituted of a plurality of groups that are on the same order as the hierarchical group 21, the information processing equipment 30, and the facility equipment 40. An upper-order hierarchical group includes a lower-order hierarchical group, and hence cooperative control in which the upper-order and lower-order hierarchical groups cooperate with each other is accomplished by compiling operating information from the lower order to the upper order.

The location information 57 includes identification data for identifying the position coordinates or location of the information processing equipment 30 to 33 and the facility equipment 40 to 43, and desirably includes identification data associated with a located hierarchy level. "Located hierarchy level" refers to a hierarchy level where equipment is placed. For example, the highest located hierarchy level, a located hierarchy level below the highest located hierarchy level, and a located hierarchy level further below that located hierarchy level may be associated with the building of the datacenter, a floor in the building, and a partition on the floor, respectively. The located hierarchy level of a hierarchical group is associated with a hierarchy level to which the hierarchical group belongs. The network information 58 includes configuration data of an information processing network system of the information processing equipment 30 to 33, and a power feed system, cooling system, and control network system of the facility equipment 40 to 43. For example, only limited information processing equipment can be linked to one power feeding facility equipment component and only a limited spatial area can be cooled by one cooling facility equipment component, and hence correlated information processing equipment and facility equipment among the information processing equipment 30 to 33 and the facility equipment 40 to 43 can be associated with each other by the location information 57 and the network information 59. By checking this association relation and the system configuration data of the information processing equipment 30 to 33 and the facility equipment 40 to 43 against each other, a hierarchical group that associates a piece of information processing equipment and a piece of facility equipment with each other can be configured.

The operating information 59 collected by the operating information gathering program 54 includes data that indicates workload and operating environment in the case of the operating information 59 of the information processing equipment 30 to 33. For example, the operating information 59 includes operating performance, active/sleep state, resource utilization, power consumption, power supply state, cooling fan state, operating temperature, job/virtual machine allocation, and failure notification. In the case of the operating information 59 of the facility equipment 40 to 43, the included data indicates load and operating environment. For example, the operating information 59 of a power feeding facility equipment component includes power load, conversion efficiency or loss, power factor, and energization state, and the operating information 59 of a cooling facility equipment component includes thermal load, coefficient of performance or its own power consumption, temperature, humidity, flow rate, flow current direction, and failure notification. By keeping track of, for each of the hierarchical groups 20 to 23, the balance between the power consumption of the information processing equipment 30 to 33 and the power capacity or cooling capacity of the facility equipment 40 to 43, and the processing performance of the information processing equipment 30 to 33 relative to the combined power consumption of the information processing equipment 30 to 33 and the facility equipment 40 to 43, the information on a specific one of the hierarchical groups 20 to 23 can be notified to the control program 55 when a trigger event occurs or as the need arises.

The control program 55 controls, for each of the hierarchical groups 20 to 23 separately, workload allocation and operating conditions of the information processing equipment 30 to 33 and operating conditions of the facility equipment 40 to 43. The execution of this control is triggered by, for example, a change in hierarchical group configuration, a violation of a constraining condition, the arrival of a time point in the job schedule, a failure sign, maintenance work, and a failure. For the information processing equipment 30 to 33, the control program 55 performs, for example, job allocation with the use of a job scheduler or a load balancer, virtual resource allocation or migration to physical resources in the case of a virtualized environment, active/sleep state switching based on resource utilization or power consumption limit settings, and powering on/off. For the facility equipment 40 to 43, in the case of a power feeding facility equipment component, the control program 55 controls, for example, the switching of power feed systems, the count of power supply units, and an auxiliary power supply, whereas, in the case of a cooling facility equipment component, the control program 55 controls the supply air/return air temperature and air volume of an air-conditioner, a damper of an air supply/exhaust opening, the temperature and flow rate of a refrigerant for liquid cooling, and the count of air-conditioners that are running. In this manner, the total power of the information processing system 10 which is the combined power consumption of the information processing equipment 30 to 33 and the facility equipment 40 to 43 is reduced while maintaining the processing performance of the information processing equipment 30 to 33.

Based on the operation management method for the information processing system 10 of the first embodiment, the hierarchical groups 20 to 23 are configured to include the information processing equipment 30 to 33 and their associated facility equipment 40 to 43, and optimization control in which the information processing equipment and the facility equipment cooperate with each other is performed hierarchically. The resultant effects include improved system operation efficiency and flexibility compared to total optimization, and improved processing performance per total power of the information processing system 10, which helps to balance performance enhancement and power saving. In addition, efficient operation management is realized by performing update control on a relevant hierarchical group when a desired trigger event occurs, when the scheduled time arrives, when work load is applied or workload application ends, when there is a change or a failure in equipment, or the like.

The information processing system 10 is typically a data-center or a computer room, but this embodiment is also applicable to an operation running system of industrial equipment, commercial equipment, communication equipment, a transport mode, and others. This embodiment is useful not only for steady operation management of an existing system but also as a design/diagnostic tool used at the time of new system installation, system expansion, system relocation, repair, maintenance, or the like. This embodiment can also be applied to a system that spans a plurality of facilities or sites if hierarchical groups are configured and remote management is executed.

The information processing equipment 30 to 33 include a server machine, storage, network equipment, and the like. A server machine is, for example, a general-purpose server, a dedicated server, a mainframe, a parallel computer, a super computer, an embedded computer, or a personal computer. Although omitted from FIG. 1, each server machine may have the same hardware as that of the operation management unit 50. For example, each server machine may include an interface (not shown), which is connected to a network as the interface 51 is, a processor (CPU) (not shown), which is connected to the interface as the processor 52 is, and a memory (not shown), which is connected to the processor as the memory 53 is.

Storage is, for example, a magnetic disk drive, a solid state disk drive, an optical disc drive, or a tape drive. Although omitted from FIG. 1, each piece of storage may include an interface (not shown) connected to a network, a processor (i.e., controller) (not shown) connected to the interface, a memory (not shown) connected to the processor, a magnetic disk drive (not shown) connected to the processor, and others.

Network equipment includes, for example, a router, a switch, or a hub. A printer, a copier, a modem, a display, and the like may further be included as peripheral devices.

This embodiment is also applicable to a device that has a demand-based switching (DBS) function for switching among active/standby/sleep/shut down states, i.e., a power saving mode. For example, the power saving mode corresponds to DBS in a server, massive array of inactive disks (MAID) in storage, and port power supply control in a network. The hardware form to which this embodiment can be applied is not limited to the blade type, the rack mount type, the tower type, and the special casing type, and this embodiment is applicable to any hardware form in various manners.

Workload of the information processing equipment 30 to 33 refers to application software in the case of a server machine, access data in the case of storage, and transfer data or the like in the case of network equipment. Workload data includes performance, resource utilization, active/sleep state, and the like in the case of a server machine, the count of active disks, access frequency, and the like in the case of storage, and the count of transfer packets, switching frequency, and the like in the case of network equipment. Workload types include fixed-point/floating-point operation, transaction processing, database processing, technical calculation, data format and granularity, guaranteed bandwidth, and the like. These types may be distinguished from one another when the operation management unit 50 controls the information processing equipment 30 to 33.

The facility equipment 40 to 43 each include power feeding facility equipment components, which include a transformer, an uninterruptible power-supply system, a switchboard, a panelboard, and a power supply of a rack where information processing equipment is mounted, and which also includes a power sensor, a current/voltage sensor, a current leakage sensor, and the like. In some cases, a power plant that is the source of power feed, power transmission equipment, substation equipment, and a built-in power supply of information processing equipment that is the destination of power feed, too, are control targets. The facility equipment 40 to 43 each include cooling facility equipment components, which include an air-conditioner, a chiller, a cooling tower, an air supply/exhaust opening, a fan, a duct, and refrigerant piping, and which also includes temperature sensors disposed inside or outside the room, a humidity sensor, a flow rate/flow current direction sensor, and the like. In some cases, liquid cooling equipment, local cooling equipment for cooling a rack row or the front/rear of a rack, and built-in cooling equipment of information processing equipment, too, are control targets.

As the operation management unit 50, a shared manager server which manages the information processing equipment 30 to 33 and the facility equipment 40 to 43 both may be provided, or a plurality of manager servers may be provided to manage the information processing equipment and the facility equipment separately and then cooperate with one another for joint management of the information processing equipment and the facility equipment. Alternatively, a component of the information processing equipment 30 to 33 may be given a manager function. An operation management method according to this invention can be implemented also as software such as middleware, application software, embedded control software, or firmware. For example, an engine that performs optimization control may be implemented as hardware. An agent, a service processor, an interface, and others may be provided in each of the information processing equipment 30 to 33 and each of the facility equipment 40 to 43 in order for the manager to obtain the operating information of the information processing equipment 30 to 33 and the facility equipment 40 to 43, or the information processing equipment 30 to 33 and the facility equipment 40 to 43 may themselves build autonomous distributed systems. The effects of this invention which are improved operation efficiency and power saving of an information processing system are brought out by controlling the information processing system for each hierarchical group, which is constituted of information processing equipment and facility equipment, separately based on operating information, and the effects are not exclusive to the system configuration and control procedure of FIG. 1.

Concrete examples of the information processing system according to the first embodiment are described next.

FIGS. 2A and 2B are system configuration diagrams illustrating a first concrete example of the first embodiment of this invention.

FIG. 3 is an operation management hierarchy diagram of the first concrete example of the first embodiment of this invention.

Figure 4:
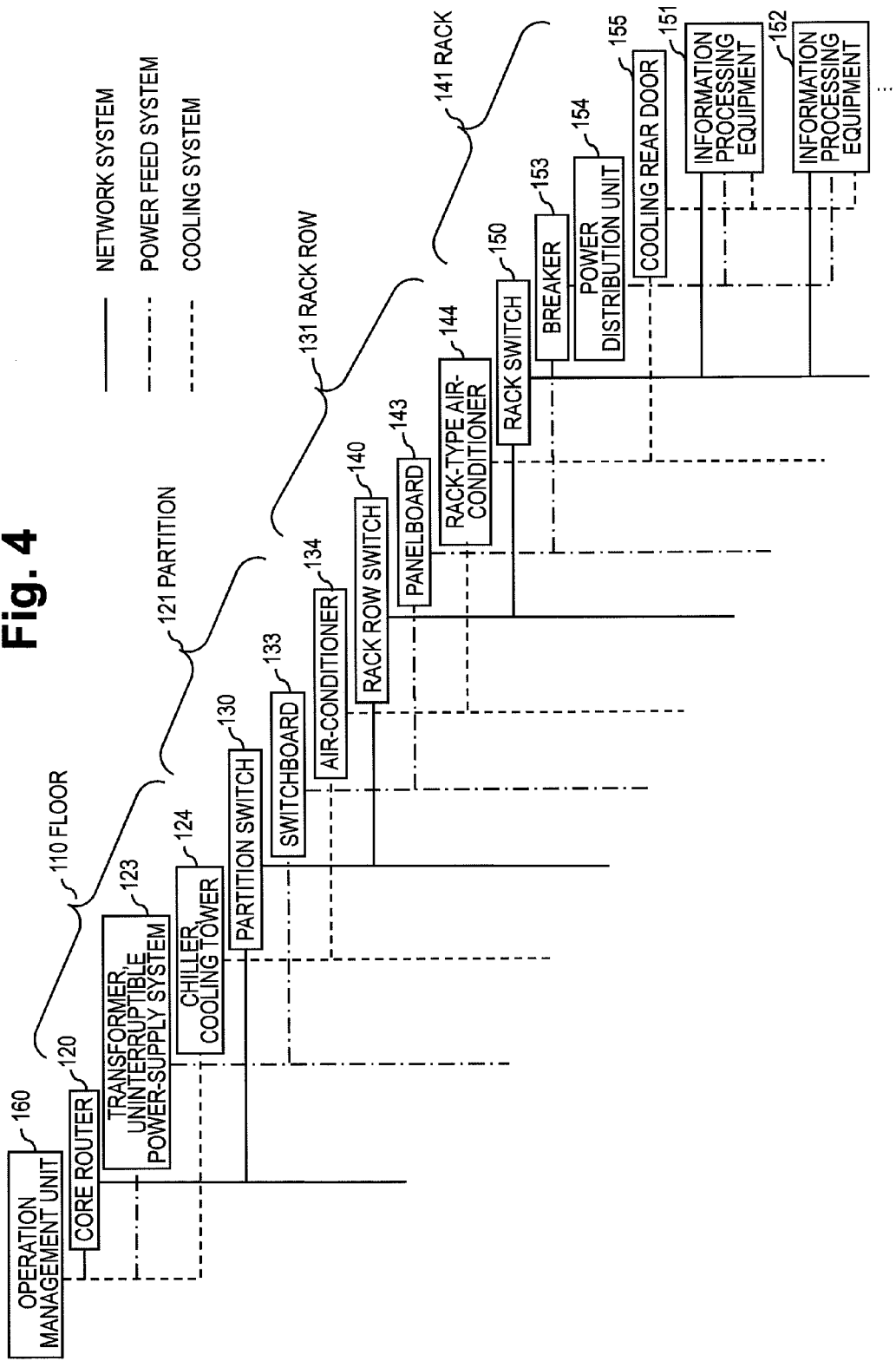
FIG. 4 is an operation management system diagram of the first concrete example of the first embodiment of this invention.

FIG. 4 is an operation management system diagram of the first concrete example of the first embodiment of this invention.

The information processing system of FIGS. 2A and 2B is constituted of a datacenter 100 and an operation management unit 160 which controls the datacenter 100. Hierarchical groups are configured in association with located hierarchical levels. Hierarchy levels in the example of FIG. 2B are listed sequentially from upper order as a first hierarchy level, which is for the building 100, a second hierarchy level, which is for floors 110 and 111, a third hierarchy level, which is for partitions 121 and 122, a fourth hierarchy level, which is for rack rows 131 and 132, a fifth hierarchy level, which is for racks 141 and 142, and a sixth hierarchy level, which is for information processing equipment components 151 and 152 of in-rack 156.

A network that couples the information processing equipment components 151 and 152 constitutes hierarchical routing associated with located hierarchy levels, and is connected to information processing equipment components 151 and 152 from a core router 120 of an upper level through a partition switch 130, a rack row switch 140, and a rack switch 150. The core router 120 is disposed on the floor 110 (the third hierarchy layer) but, because this component connects the floor 110 to the outside and integrates the partitions 121 and 122, is associated with the second hierarchy level which is one level higher. Similarly, the partition switch 130 which is disposed in the partition 121 to integrate the rack rows 131 and 132 is associated with the third hierarchy level, the rack row switch 140 which is disposed in the rack row 131 to integrate the racks 141 and 142 is associated with the fourth hierarchy level, and the rack switch 150 which is disposed in the rack 141 to integrate the information processing equipment components 151 and 152 is associated with the fifth hierarchy level. In the case where the information processing equipment components 151 and 152 each have a built-in switch 157 as in, for example, a blade server (see FIG. 3), the built-in switch 157 is associated with the sixth hierarchy level.

Power feeding facility equipment that supplies power to the information processing equipment components 151 and 152 constitutes a hierarchical power feed system associated with located hierarchy levels, and supplies power to the information processing equipment components 151 and 152 from a transformer-uninterruptible power-supply system 123 of an upper level through a switchboard 133, a panelboard 143, a breaker 153, and a power distribution unit 154 of the rack 141. The transformer-uninterruptible power-supply system 123 may be disposed on the floor 110 (the third hierarchy level) or another floor but, because this component handles power feeding to the partitions 121 and 122, is associated with the second hierarchy level which is one level higher. Similarly, the switchboard 133 which is disposed in the partition 121 to handles power feeding to the rack rows 131 and 132 is associated with the third hierarchy level. The panelboard 143 which is disposed as a child branch in the switchboard 133 or in the rack rows 131 and 132 to handle power feeding to the racks 141 and 142 is associated with the fourth hierarchy level. The breaker 153 is disposed in the panelboard 143 and connected to the power distribution unit 154, which is disposed in the rack 141 to handle power feeding to the information processing equipment components 151 and 152. The breaker 153 and the power distribution unit 154 are therefore associated with the fifth hierarchy level. In the case where the information processing equipment components 151 and 152 each have a built-in power supply 158 (see FIG. 3), for example, the built-in power supply 158 is associated with the sixth hierarchy level.

Cooling facility equipment that cools the information processing equipment components 151 and 152 constitutes a hierarchical cooling system associated with located hierarchy levels, and cools the information processing equipment components 151 and 152 from a chiller-cooling tower 124 of an upper level through an air-conditioner 134, a rack-type air-conditioner 144, and a cooling rear door 155 of the rack 141. The chiller-cooling tower 124 may be disposed on the floor 110 (the third hierarchy level) or another floor but, because this component handles the cooling of the partitions 121 and 122, is associated with the second hierarchy level which is one level higher. Similarly, the air-conditioner 134 which is disposed in the partition 121 to handle the cooling of the rack rows 131 and 132 is associated with the third hierarchy level. The rack-type air-conditioner 144 which is disposed in the rack row 131 to handle the cooling of the racks 141 and 142 is associated with the fourth hierarchy level. The cooling rear door 155 which is attached to the rack 141 to handle the cooling of the information processing equipment components 151 and 152 is associated with the fifth hierarchy level. In the case where the information processing equipment components 151 and 152 each have a built-in cooling fan 159 (see FIG. 3), for example, the built-in cooling fan 159 is associated with the sixth hierarchy level.

In this manner, as illustrated in FIG. 4, an information processing network system constituted of the information processing equipment components 151 and 152 and the network equipment components 120, 130, 140, and 150, a power feed system constituted of the power feeding facility equipment components 123, 133, 143, 153, and 154, and a cooling system constituted of cooling facility equipment components 124, 134, 144, and 155 are matched to integrate control system from the operation management unit 160 down to the information processing equipment components 151 and 152 of the sixth hierarchical group. Information processing equipment and facility equipment are thus controlled in association with each other for each hierarchical group separately, and efficient integrated operation management is accomplished by hierarchical control in which an upper-order hierarchical group and a lower-order hierarchical group cooperate with each other.

In this embodiment, the highest hierarchy level is the first hierarchy level and a hierarchy level below the highest hierarchy level is the second hierarchy level as illustrated in FIG. 3. However, this numbering of hierarchy levels is merely an example and, for instance, the lowest hierarchy level and a hierarchy level above the lowest hierarchy level may be the first hierarchy level and the second hierarchy level, respectively.

The relation of the hierarchical groups 20 to 30 of FIG. 1 and FIG. 2B is now described. The information processing system of FIGS. 2A to 4 is one of concrete examples of the information processing system 10 illustrated in FIG. 1. For instance, the information processing equipment components 151 and 152 of FIG. 2B may correspond to the information processing equipment 33, and the breaker 153, the power distribution unit 154, and the cooling rear door 155 may correspond to the facility equipment 43. In this case, the rack 141 corresponds to the hierarchical group 23. The rack switch 150 in the rack 141 and a rack switch (not shown) in the rack 142 may correspond to the information processing equipment 32, and the panelboard 143 and the rack-type air conditioner 144 may correspond to the facility equipment 42. In this case, the rack row 131 corresponds to the hierarchical group 22. The rack row switch 140 in the rack row 131 and a rack row switch (not shown) in the rack row 132 may correspond to the information processing equipment 31, and the switchboard 133 and the air-conditioner 134 may correspond to the facility equipment 41. In this case, the partition 121 corresponds to the hierarchical group 21.

The hierarchy level count in FIG. 1 and the hierarchy level count in FIG. 2B differ from each other. This is because FIG. 1 and FIG. 2B each show only components necessary for illustration and omit the rest. In practice, any number of hierarchical levels can be set in the information processing system. For example, in FIG. 1, a hierarchical group belonging to a hierarchical level higher than that of the hierarchical group 20 may further be set to correspond to the datacenter 100 of FIG. 2B.

The operation management unit 160 keeps hierarchical group configuration information 164, and collects operating information 165 for each hierarchical group. The hierarchical group configuration information 164 includes information that defines the hierarchical group configuration of FIGS. 3 and 4. Based on the hierarchical group configuration information 164 and on the operating information 165 of each hierarchical group, the operation management unit 160 executes, for each hierarchical group separately, workload control 161 or operating control 162 of the information processing equipment components 151, 152, 120, 130, 140, 150, and 157, and operating control 163 of the facility equipment components 123, 133, 143, 153, 154, 158, 124, 134, 144, 155, and 159. The association relation is clear between information processing equipment and facility equipment in a hierarchical group and between an upper-order hierarchical group and a lower-order hierarchical group, and hence efficient optimization is accomplished by identifying, from the operating information 165 compiled on a hierarchical group-by-hierarchical group basis, which information processing equipment and facility equipment are to be controlled.

For example, in the partition 121 of the third hierarchy level, the operation management unit 160 integrates, for monitoring, the workload and operating information 165 of the information processing equipment components 151, 152, 130, 140, and 150, which belong to this hierarchical group, and further monitors the operating information 165 of the switchboard 133 and the air-conditioner 134, which are included in the facility equipment belonging to this hierarchical group. The workload control 161 of the information processing equipment allocates workload preferentially to one of the rack rows 131 and 132 belonging to the partition 121 that has higher information processing performance relative to total power that combines power consumed by the information processing equipment and feeding loss and cooling power of the facility equipment. Workload allocation in this manner may be implemented by the workload control 161 by controlling a job scheduler (not shown in the drawing) or a load balancer (not shown) which executes job allocation or, in a virtualized environment, may be implemented by the operation management unit 160 by controlling virtual machine management software (not shown) which executes allocation or migration of a virtual resource to a physical resource. The operating control 162 reduces power consumption by switching the active/standby/sleep/shutdown state, the operating frequency, the operating voltage, the power on/off state, or the like based on the workload of the information processing equipment components 151, 152, 130, 140, and 150. The operating control 163 of the facility equipment reduces feeding loss and cooling power by controlling the power factor or the like of the switchboard 133 and controlling the supply air/return air temperature, air volume, or the like of the air-conditioner 134 in a manner that suits the power consumption of the information processing equipment components 151, 152, 130, 140, and 150. By thus minimizing the combined power consumption of the information processing equipment and the facility equipment while maintaining operation services of the information processing equipment components 151, 152, 130, 140, and 150, the overall performance-to-power efficiency of the hierarchical group of the partition 121 is improved.

The operation management unit 160 of FIG. 2A corresponds to the operation management unit 50 of FIG. 1. An illustration and description about the hardware configuration of the operation management unit 160 are therefore omitted. The hierarchical group configuration information 164 and the hierarchical group operating information 165 correspond respectively to the hierarchical group configuration information 56 and hierarchical group operating information 59 of FIG. 1. The functions of the information processing equipment workload control 161, the information processing equipment operating control 162, and the facility equipment operating control 163 are implemented by the processor 52 of FIG. 1 by executing the hierarchical group control program 55. Accordingly, processing executed by these functions is actually executed by the processor of the operation management unit 160.

When the total power of the information processing equipment components 151, 152, 130, 140, and 150 is compared against the maximum power capacity, namely, allowable power load, of the switchboard 133 and the former is expected to exceed the latter, a drop or cutoff of power supply voltage supplied to the partition 121, or the like, may cause problems such as shutting down of equipment components in the partition 121. When a differential power calculated by subtracting, from the total power of the information processing equipment components 151, 152, 130, 140, and 150, the cooling power of the lower-order rack-type air-conditioner 144 and cooling rear door 155 is compared against the maximum cooling capacity, namely, allowable thermal load, of the air-conditioner 134, and the former is expected to exceed the latter, overheating of equipment components in the partition 121 may cause problems such as a drop in processing performance and a failure in an equipment component. When a prediction as those described above is made due to some anomaly, executing optimization control in the partition 121 does not prevent the problems described above. Therefore, in the case where changing workload allocation is possible, the operation management unit 160 shifts workload from the partition 121 to the partition 122, which belongs to a group of the same order. In the case where workload allocation cannot be changed, the operation management unit 160 follows operation procedures to execute control by reducing low-priority workload in the partition 121, by curtailing the limit power consumption of the information processing equipment components 151, 152, 130, 140, and 150 in an active state, by, when there is an auxiliary power supply or a redundant power feed system, enhancing the power capacity of the switchboard 133 with the use of the auxiliary power supply or the redundant power feed system, by, when the rack-type air conditioner 144 or the cooling rear door 155 has reserve capacity, backing the air-conditioner 134 up with the reserve capacity, or the like. The procedures are described later with reference to FIG. 11.

In such cases where the configuration of the information processing equipment or the facility equipment in the partition 121 is changed, where the partition 121 is relocated on the floor 110, or where the partition 121 is removed from the floor 110, the operation management unit 160 updates or deletes the configuration information 164 of the partition 121 and of the hierarchical groups below the partition 121. There is no need to change the configuration information 164 of the other partition 122 in this case. The operating information of the partition 121 is compiled in the operating information 165 of the floor 100 belonging to an upper-order group, and the update of the partition 121 is automatically reflected. In the case where a partition belonging to a group of the same order as the partition 121 is newly added, adding information about the new partition to the configuration information 164 is sufficient and it is not necessary to update information about the other partitions. With the partition-by-partition basis optimization described above, after the configuration is changed by an addition or removal of a partition, the other partitions are not affected by the change in configuration and can be optimized in the same way as before the change. This embodiment is thus capable of adapting flexibly to meet requested operation services and required performance, and scalable flexibility is consequently realized.

While the preceding description takes the partition 121 of the third hierarchy level as an example, the entire datacenter 100 can be optimized efficiently by similarly controlling the other hierarchical groups based on the hierarchical relation. In the case where all information processing equipment and facility equipment at the datacenter 100 are to be optimized in a lump, obtaining an optimal solution is difficult because the dependency relation between the equipment is not clear and, even if the dependency relation can be defined, too wide a solution space makes convergence poor and efficiency low. In this embodiment, with hierarchical group-by-hierarchical group basis optimization instead of total optimization, the solution space is narrowed and an optimal solution is therefore obtained efficiently.

According to the operation management method for the datacenter 100 which has been described with reference to FIGS. 2A to 4, hierarchical groups ranging from the first hierarchy level to the sixth hierarchy level are configured from the information processing equipment components 151, 152, 120, 130, 140, and 150 and the facility equipment components 123, 133, 143, 153, 154, 124, 134, 144, and 155, and hierarchical optimization in which the information processing equipment and the facility equipment cooperate with each other is performed. The resultant effect is improvements in the operation efficiency, performance-to-power efficiency, and flexibility of the datacenter 100, and integrated operation management is accomplished while balancing performance enhancement and power saving for sophisticated and diverse operation services.

In the example of FIG. 2B, the datacenter 100 is constructed from the building 100, the floors 110 and 111, and others. However, this embodiment is also applicable to a modular datacenter, a container datacenter, a computer room in a part of a building, or the like, and can exert the effects described above in that case, too. For example, a module or a container may correspond to a partition and, for a datacenter that spans a plurality of buildings or sites, a hierarchy level higher than that of the buildings is defined.

Instead of the hierarchical group configuration starting from the building 100 of the first hierarchy level and reaching the information processing equipment components 151 and 152 of the sixth hierarchy level, a different hierarchy configuration may be employed to suit the configuration or placement of the information processing equipment and the facility equipment. For example, the rack row level may be put immediately below the floor level in hierarchy without interposing the partition level, and the rack level may be put immediately below the partition level in hierarchy without interposing the rack row level.

The information processing equipment components 151 and 152 mounted to the rack 141 are, for example, a server machine and storage, and the racks 141 and 142 constitute the rack row 131. Alternatively, information processing equipment components may be free-standing instead of being mounted on a rack, and racks may be arranged discretely without forming a rack row. Network equipment has so-called top-of-rack architecture and includes the core router 120, the partition switch 130, the rack row switch 140, and the rack switch, but may have a different type of architecture that suits the required network performance or the placement of racks. For example, the partition switch may be omitted to connect the rack row switch directly to the core router, and the rack row switch or the rack switch may be omitted to connect information processing equipment directly to the partition switch.

The power feeding facility equipment is constituted of the transformer-uninterruptible power-supply system 123, the switchboard 133, the panelboard 143, the breaker 153, and the power distribution unit 154, but a different power feed configuration may be employed to suit design specifications, a required capacity, or the like. For example, the uninterruptible power-supply system 123 may be connected directly to the panelboard 143, and the switchboard 133 may be connected directly to a power distribution unit of the rack 141. Uninterruptible power-supply systems may be arranged discretely as a shared power supply of the rack 141 and built-in power supplies of the information processing equipment components 151 and 152.

The cooling facility equipment is constituted of the chiller-cooling tower 124, the air-conditioner 134, the rack-type air-conditioner 144, and the cooling rear door 155, but a different cooling configuration may be employed to suit design specifications, a required capacity, or the like. For example, when the air-conditioning capacity is more than sufficient, the rack-type air conditioner or the cooling rear door may not be put into use, or the rack-type air-conditioner alone may be used for air conditioning without providing the air-conditioner, or outdoor air cooling or free cooling may be employed depending on the site location of the datacenter.

In the example of FIGS. 2A to 4, the operation management unit 160 performs the workload control 161 and operating control 162 of the information processing equipment and the operating control 163 of the facility equipment on a hierarchical group-by-hierarchical group basis, thereby raising the efficiency of control processing. Depending on the processing performance of the operation management unit 160 itself and what software is installed, for example, centralized processing in which hierarchical group-by-hierarchical group basis control proceeds sequentially from an upper order to a lower order or distributed cooperative processing consisting of hierarchical group-by-hierarchical group basis distributed control and cooperating control between hierarchical groups may be executed, or a plurality of operation management units may be provided in a number suitable for the processing scale to cooperate with one another. The essence of this embodiment lies in hierarchical control of hierarchical groups provided in an information processing system, and this embodiment is not limited solely to the equipment configuration and control method of FIGS. 2A to 4.

Figure 5:
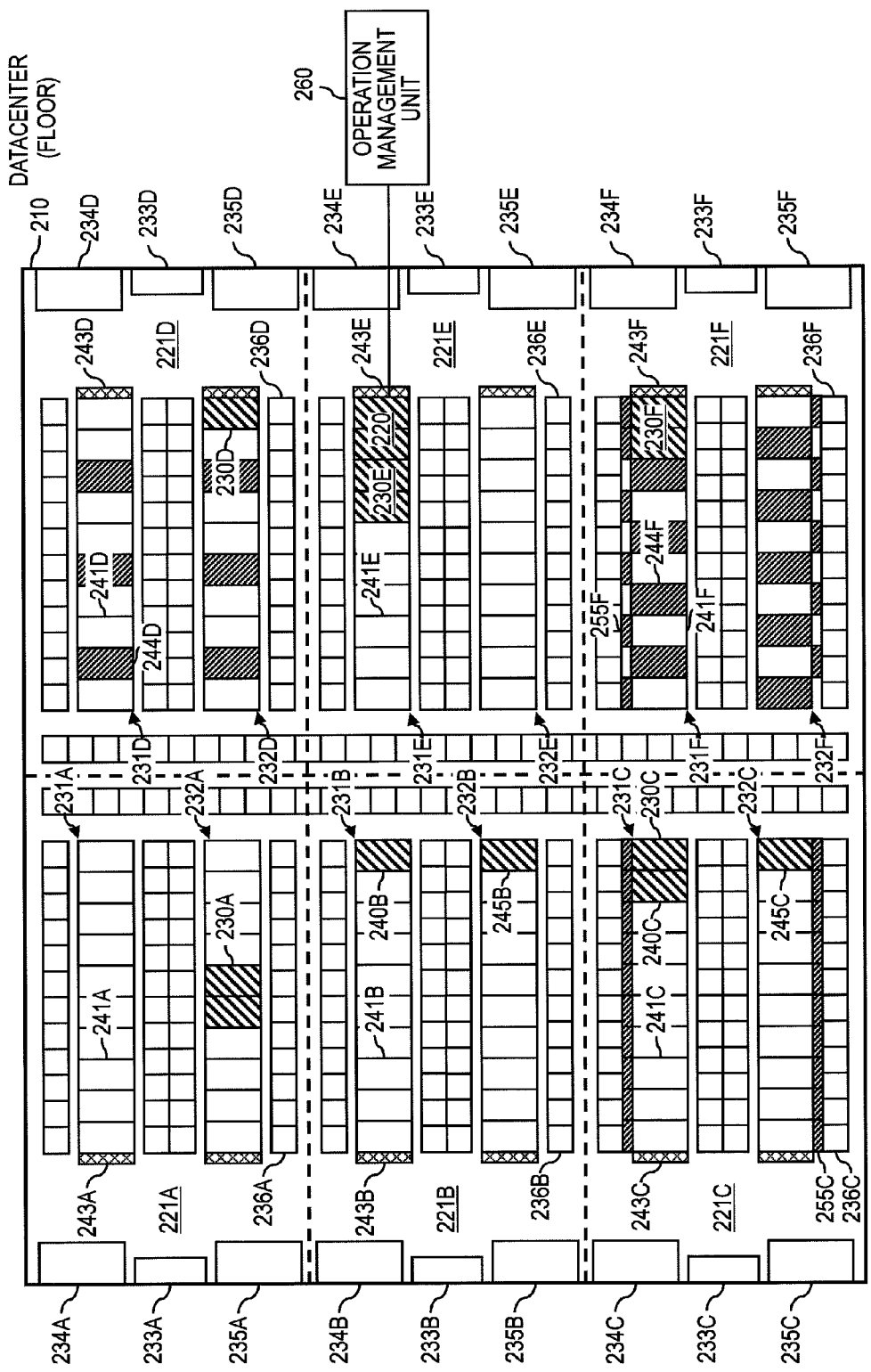
FIG. 5 is a layout diagram illustrating a second concrete example of the first embodiment of this invention.

FIG. 5 is a layout diagram illustrating a second concrete example of the first embodiment of this invention.

An information processing system of FIG. 5 includes a datacenter 210, which takes up one entire floor (hereinafter also referred to as floor 210), and an operation management unit 260. The floor 210 is divided into partitions 221A to 221F. The hierarchical group configuration is associated with located hierarchy levels, and starts from the first hierarchy level, which is made up by a core router 220 provided on the floor 210 to integrate the partitions 221A to 221F, and continues down to lower-order groups. The operation management unit 260 is connected to the core router 220 to control information processing equipment and facility equipment on the floor 210 via the core router 220.

The second hierarchical group (namely, a hierarchical group on the second hierarchy level. The same is true in the following description.) of the partition 221A is made up of a partition switch 230A (so-called middle-of-row switch), a switchboard 233A, air conditioners 234A and 235A, and grille panels 236A. The third hierarchical group (namely, a hierarchical group on the third hierarchy level. The same is true in the following description.) of the partition 221A is made up of rack rows 231A and 232A and panelboards 243A. The fourth hierarchical group (namely, a hierarchical group on the fourth hierarchy level. The same is true in the following description.) of the partition 221A is made up of racks 241A. The fifth hierarchical group (namely, a hierarchical group on the fifth hierarchy level. The same is true in the following description.) of the partition 221A is made up of information processing equipment in the racks 241A. The operation management unit 260 controls, via the core router 220 and the partition switch 230A, the information processing equipment mounted in the rack rows 231A and 232A, the switchboard 233A and the panelboards 243A which supply power to the rack rows 231A and 232A, and the air-conditioners 234A and 235A which cool the rack rows 231A and 232A. The air-conditioners 234A and 235A supply cool air to the information processing equipment from under the floor through the grille panels 236A.

The second hierarchical group of the partition 221B is made up of a switchboard 233B, air conditioners 234B and 235B, and grille panels 236B. The third hierarchical group of the partition 221B is made up of rack row switches 240B and 245B (so-called end-of-row switch), rack rows 231B and 232B, and panelboards 243B. The fourth hierarchical group of the partition 221B is made up of racks 241B. The fifth hierarchical group is made up of information processing equipment in the racks 241B. In the partition 221B, the rack row switches 240B and 245B, instead of a partition switch, integrate information processing networks of the racks 241B disposed in the rack rows 231B and 232B, respectively, and serve as a control system of the switchboard 233B, the panelboards 243B, and the air-conditioners 234B and 235B.

The second hierarchical group of the partition 221C is made up of a partition switch 230C, a switchboard 233C, air conditioners 234C and 235C, and grille panels 236C. The third hierarchical group of the partition 221C is made up of rack row switches 240C and 245C, rack rows 231C and 232C, and panelboards 243C. The fourth hierarchical group of the partition 221C is made up of racks 241C and cooling rear doors 255C. The fifth hierarchical group is made up of information processing equipment in the racks 241C. In the partition 221C, the rack row switches 240C and 245C respectively integrate the racks 241C, the cooling rear doors 255C, and the panelboards 243C which are disposed in the rack rows 231C and 232C. The partition switch 230C integrates the rack row switches 240C and 245C, the switchboard 233C, and the air-conditioners 234C and 235C, and is connected to the core router 220. The information processing equipment mounted on the racks 241C is cooled by the air-conditioners 234C and 235C and the cooling rear doors 255C.

The second hierarchical group of the partition 221D is made up of a partition switch 230D, a switchboard 233D, air conditioners 234D and 235D, and grille panels 236D. The third hierarchical group of the partition 221D is made up of rack rows 231D and 232D, panelboards 243D, and rack-type air-conditioners 244D. The fourth hierarchical group of the partition 221D is made up of racks 241D. The fifth hierarchical group is made up of information processing equipment in the racks 241D. In the partition 221D, the partition switch 230D integrates the racks 241D, the rack-type air-conditioners 244D, and the panelboards 243D which are disposed in the rack rows 231D and 232D, as well as the switchboard 233D and the air-conditioners 234D and 235D which are placed in the partition 221D. Each of the rack-type air-conditioners 244D handles the cooling of information processing equipment mounted on the racks 241D that are adjacent to the rack-type air conditioner 244D.

The second hierarchical group of the partition 221E is made up of a partition switch 230E, a switchboard 233E, air conditioners 234E and 235E, and grille panels 236E. The third hierarchical group of the partition 221E is made up of rack rows 231E and 232E and panelboards 243E. The fourth hierarchical group of the partition 221E is made up of racks 241E. The fifth hierarchical group is made up of information processing equipment in the racks 241E. In the rack row 231E, the core router 220 of the first hierarchy level is disposed. The core router 220 integrates the partition switch 230A of the partition 221A, the rack row switches 240B and 245B of the partition 221B, the partition switch 230C of the partition 221C, the partition switch 230D of the partition 221D, the partition switch 230E of the partition 221E, and a partition switch 230F of the partition 221F.

The second hierarchical group of the partition 221F is made up of the partition switch 230F, a switchboard 233F, air conditioners 234F and 235F, and grille panels 236F. The third hierarchical group of the partition 221F is made up of rack rows 231F and 232F, panelboards 243F, and rack-type air-conditioners 244F. The fourth hierarchical group of the partition 221F is made up of racks 241F and cooling rear doors 255F. The fifth hierarchical group is made up of information processing equipment in the racks 241F. The rack-type air-conditioners 244F and the cooling rear doors 255F supplement the cooling capacity of the air-conditioners 234F and 235F to cool the information processing equipment mounted on the racks 241F.

For example, the cooling rear doors 255F may each correspond to the cooling rear door 155 of FIG. 2B, the racks 241F may each correspond to the rack 141 of FIG. 2B, the panelboards 243F may each correspond to the panelboard 143 of FIG. 2B, the rack-type air-conditioners 244F may each correspond to the rack-type air conditioner 144 of FIG. 2B, the rack row 231F may correspond to the rack row 131 of FIG. 2B, the partition switch 230F may correspond to the partition switch 130 of FIG. 2B, and the core router 220 may correspond to the core router 120 of FIG. 2B. However, unlike FIG. 2B, FIG. 5 illustrates an example in which one floor corresponds to one datacenter. The operation management unit 260 corresponds to the operation management unit 50 of FIG. 1 and the operation management unit 160 of FIG. 2A, and a description on the configuration thereof is therefore omitted.

In the system of FIG. 5, the core router 220 is disposed in a manner that suits the network performance necessary for the floor 210 of the first hierarchy level, and the partition switches 230A, 230C, 230D, 230E, and 230F of the second hierarchy level, or the rack row switches 240B, 245B, 240C, and 245C of the third hierarchy level are disposed respectively for the partitions 221A, 221B, 221C, 221D, 221E, and 221F in a manner that suits the network performance necessary for the information processing equipment. The operation management unit 260 compiles operating information of the information processing equipment and operating information of the network equipment on a hierarchical group-by-hierarchical group basis to control workload or operating conditions. For example, on the second hierarchy level, the operation management unit 260 monitors the processing amount of the partition switches and the total workload in each partition, and optimizes workload allocation in each partition by referring to the operating information of the information processing equipment. When a change in network configuration is necessitated as an attempt to improve the performance of the information processing equipment or the network equipment, or as countermeasures against a failure, the operation management unit 260 updates the configuration information of a hierarchical group that corresponds to the changed part.

The information processing system of FIG. 5 includes the switchboards 233A, 233B, 233C, 233D, 233E, and 233F of the second hierarchy level and the panelboards 243A, 243B, 243C, 243D, 243E, and 243F of the third hierarchy level, which supply power to cover the power consumption of the information processing equipment in the partitions 221A, 221B, 221C, 221D, 221E, and 221F, respectively. The information processing system of FIG. 5 also includes the air-conditioners 234A, 234B, 234C, 234D, 234E, and 234F and the air-conditioners 235A, 235B, 235C, 235D, 235E, and 235F and the grille panels 236A, 236B, 236C, 236D, 236E, and 236F of the second hierarchy level, the rack-type air-conditioners 244D and 244F of the third hierarchy level, and the cooling rear doors 255C and 255F of the fourth hierarchy level, which cool the information processing equipment in the partitions 221A, 221B, 221C, 221D, 221E, and 221F, respectively. The operation management unit 260 collects operating information of the facility equipment on a hierarchical group-by-hierarchical group basis, and controls the operating conditions of the facility equipment in a manner that suits the power consumption of the information processing equipment. For example, on the second hierarchy level, the operation management unit 260 monitors the power capacity of the switchboards and the cooling capacity of the air-conditioners, and controls the power capacity and the cooling capacity in a manner that suits the power consumption of the information processing equipment. When a change in facility equipment configuration is necessitated as an attempt to improve the power capacity or cooling capacity, or by repair, the hierarchical group configuration information of the operation management unit 260 is updated.

An operation manager or the like of the information processing system enhances the power capacity by adding feeding cables and breakers leading to the switchboards and the panelboards, or by replacing existing feeding cables and breakers with those high in current capacity, and enhances the cooling capacity by replacing an existing air conditioner with one high in cooling capacity, or by adding rack-type air conditioners and cooling rear doors. The position of openings in grille panels for underfloor air conditioning and the placement of rack-type air-conditioners or cooling rear doors are adjusted to suit the power consumption distribution, namely, heat generation distribution, of the information processing equipment and network equipment, and cooling efficiency may be raised by providing a hot aisle or a cold aisle and conducting aisle capping.

For each partition of the second hierarchy level separately, air-conditioners are controlled to suit the power consumption of the information processing equipment (in the case where rack-type air-conditioners or cooling rear doors are provided, power calculated by subtracting the cooling power of the rack-type air-conditioners or the cooling rear doors from the power consumption of the information processing equipment). In practice, the effective cooling area of, for example, the air-conditioner 235A of the partition 221A reaches the neighboring partition 221B, and the air-conditioner 234B of the partition 221B in turn affects the partition 221A. However, by defining partitions in the manner illustrated in FIG. 5, where information processing equipment and an air-conditioner that are geographically close to each other are included in one partition, the influence from an air-conditioner of a neighboring partition is made smaller than the influence that the information processing equipment in each partition receives from an air-conditioner of the same partition. In this case, a substantially correct optimal solution can be obtained even when the influence from an air-conditioner of a neighboring partition is ignored. With this partition-by-partition basis control, an approximate optimal solution for an operating condition of an air conditioner is obtained more efficiently than when air-conditioners of the entire floor 210 are controlled in a lump. To control each partition completely independently of other partitions, the influence from an air-conditioner of a neighboring partition can be shut out by providing a divider or a curtain at the border between partitions.

According to the operation management method for the datacenter 210 which has been described with reference to FIG. 5, the floor 210 is divided into the partitions 221A, 221B, 221C, 221D, 221E, and 221F, and information processing equipment, network equipment, power feeding facility equipment, and cooling facility equipment are configured hierarchically for each partition, to thereby provide necessary power capacity and cooling capacity suited to desired information processing performance and network performance. Such adaptability and flexibility are favorable not only as a simple information processing resource pool but also as an integrated resource pool which includes facility equipment, and contribute to an improvement in operation efficiency. This effect is brought out by the hierarchical group-by-hierarchical group basis configuration and operation management, and is not exclusive to the layout of FIG. 5. For example, depending on operation services, partitions each including only one rack row or many more rack rows may be defined, power may be supplied to a rack row directly from a panelboard without providing a switchboard in each partition, power may be supplied to a rack row directly from a switchboard, one air-conditioner or many more air-conditioners may be disposed in each partition, rack-type air-conditioners or cooling rear doors alone may be used for cooling without providing an air-conditioner, and an aisle chamber may be provided instead of underfloor air conditioning through grille panels.

FIG. 6 is a system configuration diagram illustrating a third concrete example of the first embodiment of this invention.

More specifically, FIG. 6 illustrates concretely an example of an information processing network system of information processing equipment, power feed/cooling systems of facility equipment, and a control network system for controlling the information processing equipment and the facility equipment as those described in the first concrete example or the second concrete example.

The information processing network system of an information processing system 300 is constituted of rack switches 350 (so-called top-of-rack switches), which integrate information processing equipment 351 mounted on racks 341, a partition switch 330 or a rack row switch 340 (so-called end/middle-of-row switches), which integrates these components, and a core router 320, which integrates these components. An operation management unit 360 controls, via the information processing network system, the core router 320, the partition switch 330 or the rack row switch 340, the rack switches 350, and the information processing equipment 351.

The power feed system starts from an uninterruptible power-supply system 323 and leads to the information processing equipment 351 and the rack switches 350 through a master breaker 345 which is disposed in a switchboard 333, breakers 353 of panelboards 343 which branch from the master breaker 345, and power distribution units 354 of the racks 341 which are connected to the breakers 353. The uninterruptible power-supply system 323 is controlled by the operation management unit 360. The switchboard 333 and a control unit 346 of the panelboards 343 are connected to the partition switch 330, or to the rack row switch 340, the power distribution units 354 of the racks 341 are connected to the rack switches 350, and the switchboard 333, the control unit 346, and the power distribution units 354 are controlled via the information processing network system by the operation management unit 360.

The cooling system is constituted of a chiller 324, an air-conditioner 334, rack-type air-conditioners 344, and cooling rear doors 355 to cool the information processing equipment 351 and the rack switches 350 which are disposed in the racks 341. The chiller 324 is controlled by the operation management unit 360. A control unit 335 of the air-conditioner 334 and the rack-type air-conditioners 344 are connected to the partition switch 330, or to the rack row switch 340, the cooling rear doors 355 of the racks 341 are connected to the rack switches 350, and the control unit 335, the rack-type air-conditioners 344, and the cooling rear doors 355 are controlled via the information processing network system by the operation management unit 360 as in the case of the power feed system.

For example, the operation management unit 360 corresponds to the operation management unit 50 of FIG. 1. The racks 341, the information processing equipment 351, the rack switches 350, the partition switch 330 or the rack row switch 340, and the core router 320 correspond to the information processing equipment 30 to 33 of FIG. 1. The uninterruptible power-supply system 323, the switchboard 333, the master breaker 345, the panelboards 343, the breakers 353, the control unit 346, the power distribution units 354, the chiller 324, the air-conditioner 334, the control unit 335, the rack-type air-conditioners 344, and the cooling rear doors 355 correspond to the information processing equipment 40 to 43 of FIG. 1.

The core router 320, the uninterruptible power-supply system 323, and the chiller 324 which belong to one hierarchical group are connected to and controlled by the operation management unit 360 in the same manner. A hierarchical group below this hierarchical group includes the switchboard 333, or the panelboards 343, and the air-conditioner 334, or the rack-type air-conditioners 344, which are connected to and controlled with the partition switch 330 or the rack row switches 340. A hierarchical group of a further lower order includes the power distribution units 354 and the cooling rear doors 355 which are similarly connected to and controlled with the rack switches 350. In short, by matching the control system of the information processing equipment and the control system of the facility equipment, control that uses the same control system for each hierarchical group is realized.

According to the operation management method for the information processing system 300 of FIG. 6, the control system of the information processing equipment and the control system of the facility equipment are integrated to make hierarchical group configuration and control efficient, and the laborious work of laying control cables can be omitted by utilizing the information processing network as the control network of the facility equipment. The resultant effect is that the information processing system 300 is simplified. The amount of control information of the facility equipment is sufficiently smaller than the amount of communication information of the information processing equipment, and the influence of controlling the facility equipment on information processing performance is therefore negligible. Though not illustrated in FIG. 6, a power sensor, a room temperature sensor, or the like that is associated with a partition or a rack row may be connected to the partition switch 330 or the rack row switch 340, whereas a power sensor or a temperature sensor for monitoring the running component distribution in the racks 341 is connected to the rack switches 350, to thereby build a sensor network that utilizes the information processing network.

In FIG. 6, the information processing network that connects by communication the operation management unit 360, the core router 320, the partition switch 330 or the rack row switch 340, the rack switches 350, and the information processing equipment 351 is, for example, an Ethernet network. In order to make the information processing network and the control network into one shared network, the facility equipment, specifically, the uninterruptible power-supply system 323, the chiller 324, the control unit 346 of the switchboard 333, the control unit 335 of the air-conditioner 334, the rack-type air-conditioners 344, the power distribution units 354 of the racks 341, and the cooling rear doors 355, too, has an Ethernet interface (not shown). In the case where the control interface of the facility equipment only has a serial communication function such as RS232C or a dedicated communication function, an Ethernet converter or a relay server having a conversion function can be used.

Figure 7A:
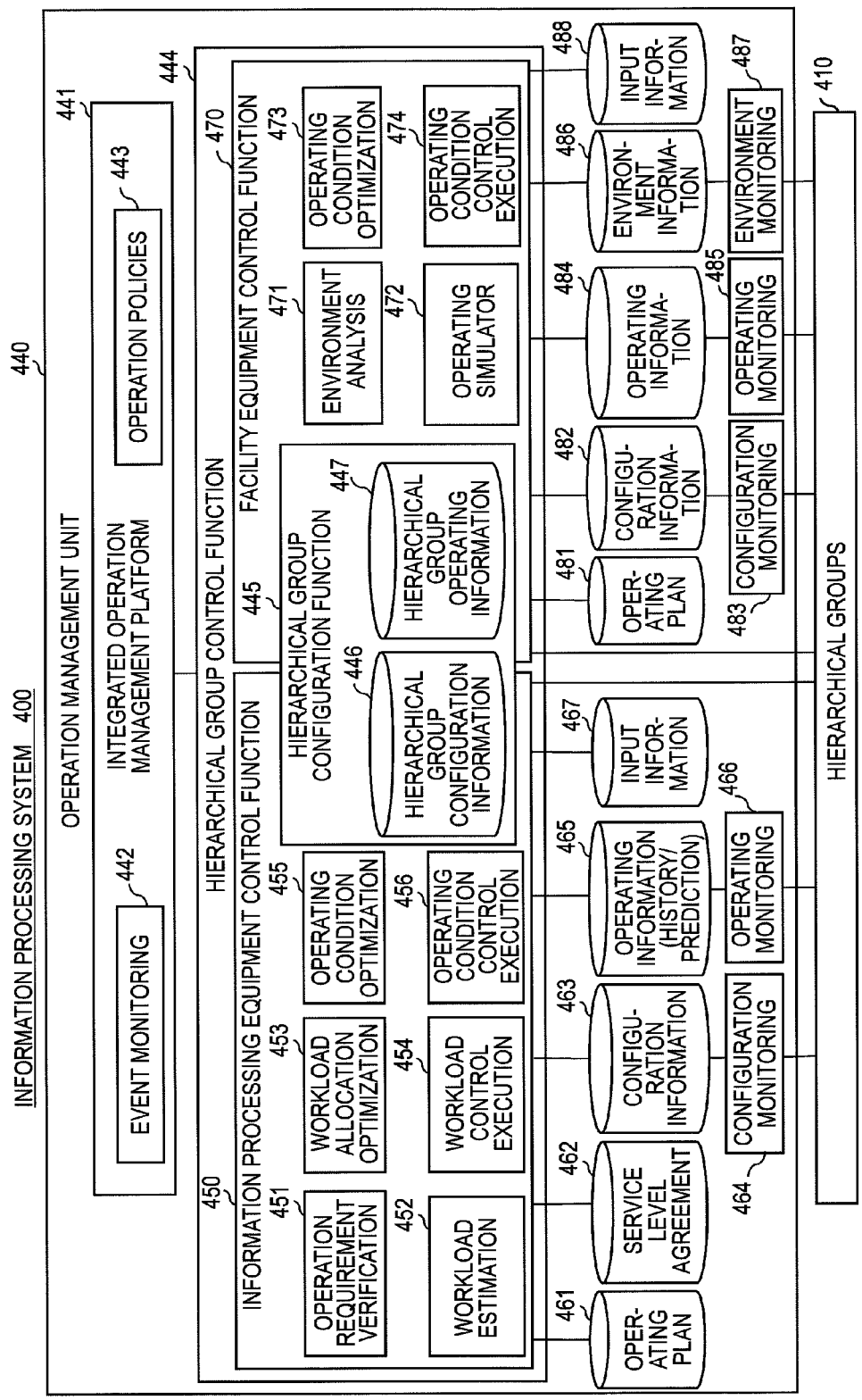
FIGS. 7A and 7B are detailed system configuration diagrams illustrating the operation management method for the information processing system according to the first embodiment of this invention.
Figure 7B:
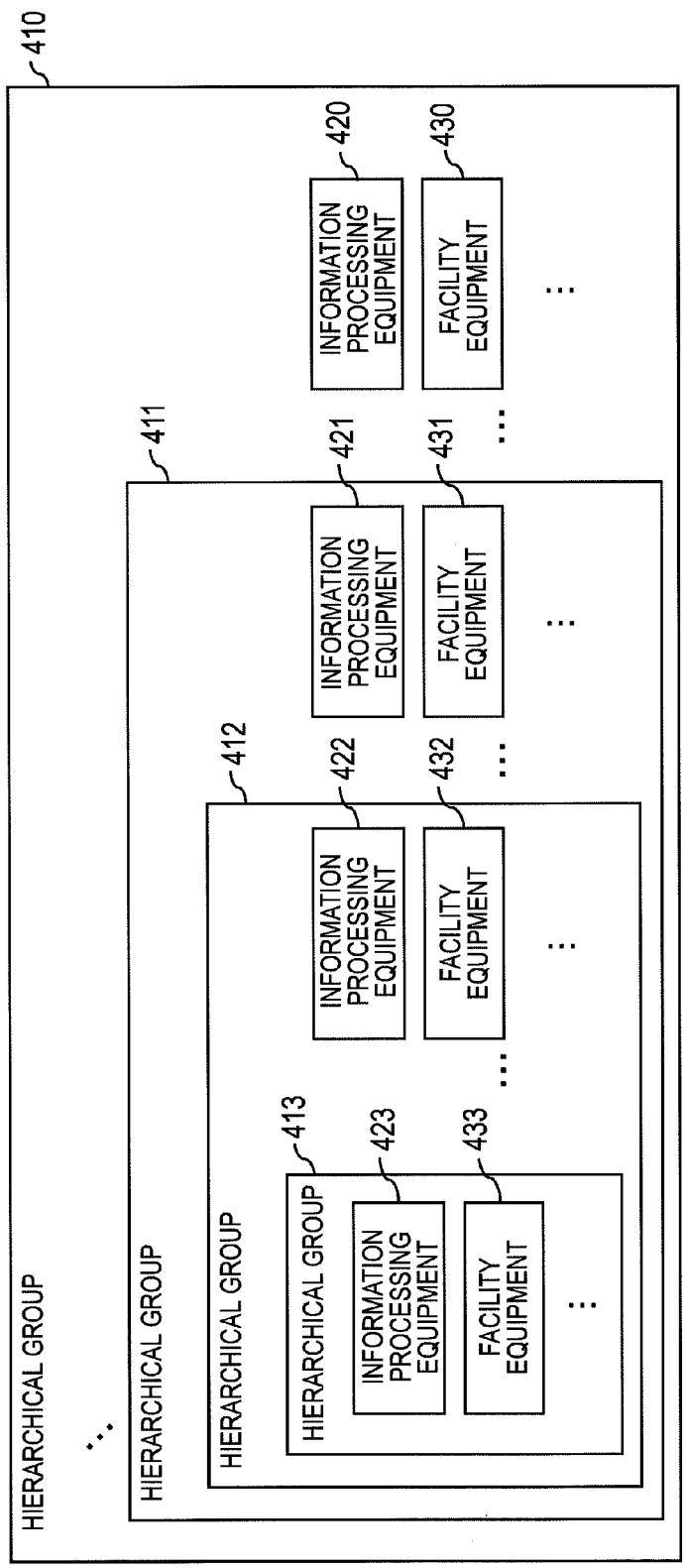

FIGS. 7A and 7B are detailed system configuration diagrams illustrating the operation management method for the information processing system according to the first embodiment of this invention.

FIG. 7A illustrates concretely an example of the operation management unit as the one described in the first concrete example or the second concrete example. An information processing system 400 of FIGS. 7A and 7B includes information processing equipment 420 to 423, facility equipment 430 to 433, which supply power to and cool the information processing equipment 420 to 423, and an operation management unit 440. The information processing equipment 420 to 423 and the facility equipment 430 to 433 constitute hierarchical groups 410 to 413. The operation management unit 440 includes an integrated operation management platform 441 and a hierarchical group control function 444. The integrated operation management platform 441 performs event management 442 of the hierarchical groups 410 to 413 through the hierarchical group control function 444, and controls the hierarchical groups 410 to 413 based on operation policies 443.

The hierarchical group control function 444 includes an information processing equipment control function 450, a facility equipment control function 470, and a hierarchical group configuration function 445 shared by the two. To describe in more detail, the information processing equipment control function 450 includes functions such as operation requirement verification 451, workload estimation 452, workload allocation optimization 453, workload control execution 454, operating condition optimization 455, and operating condition control execution 456, and has databases such as operating plan 461, service level agreement 462, configuration information 463, which is obtained from configuration monitoring 464, operating information 465, which is obtained from operating monitoring 466, and input information 467, which is about equipment specifications, resource management, layout, and the like. The facility equipment control function 470 includes functions such as environment analysis 471, operating simulator 472, operating condition optimization 473, and operating condition control execution 474, and has databases such as operating plan 481, configuration information 482, which is obtained from configuration monitoring 483, operating information 484, which is obtained from operating monitoring 485, environment information 486, which is obtained from environment monitoring 487, and input information 488, which is about equipment specifications, resource management, layout, and the like.

Based on location information and network information which are obtained from the configuration information 463, the configuration information 482, the input information 467, and the input information 488, the hierarchical group configuration function 445 generates information indicating the configuration of the hierarchical groups 410 to 413 as hierarchical group configuration information 446. The hierarchical group configuration function 445 also generates hierarchical group operating information 447 by compiling the operating information 465, the operating information 484, and the environment information 487 for each of the hierarchical groups 410 to 413 separately, based on the hierarchical group configuration information 446. The hierarchical group operating information 447 corresponds to the hierarchical group operating information 59 of FIG. 1. The hierarchical group configuration information 446 is constituted of, for example, a configuration information table 501. The hierarchical group configuration information 446 corresponds to the hierarchical group configuration information 56 of FIG. 1.

The hierarchical groups 410 to 413 are similar to the hierarchical groups 20 to 23 of FIG. 1, and a detailed description thereof is omitted. Specifically, the hierarchical groups 410 to 413 correspond to the hierarchical groups 20 to 23 of FIG. 1, respectively, the information processing equipment 420 to 423 correspond to the information processing equipment 30 to 33 of FIG. 1, respectively, and the facility equipment 430 to 433 correspond to the facility equipment 40 to 43 of FIG. 1.

FIG. 8 is an explanatory diagram of the configuration information table 501 which is kept by the information processing system of the first embodiment of this invention.

The configuration information table 501 includes an equipment ID 5011, an equipment name 5012, a hierarchy group ID 5013, a direct-line upper order 1_5014, a direct-line upper order 2_5015, other-line 1_5016, and other-line 2_5017.

The equipment ID 5011 is identification information of an equipment component belonging to a hierarchical group (or a zone where the equipment component is disposed). The equipment name 5012 indicates for each equipment component the name of the equipment component or the zone. The type of the equipment or zone (for example, whether the equipment component in question is a server or storage) can be identified based on the equipment name 5012.

The hierarchical group ID 5013 is identification information indicating for each equipment component (or zone) a hierarchical group to which the equipment component or the zone belongs. As described above, a hierarchical group is defined on a hierarchy level-by-hierarchy level basis and, accordingly, one equipment component may belong to a plurality of hierarchical groups (for example, an equipment component belongs to a hierarchical group of one hierarchy level and also belongs to a hierarchical group of a hierarchy level above this level). The hierarchical group ID includes, when an equipment component (or zone) belongs to plurality of hierarchical groups, identification information of all these hierarchical groups.

The direct-line upper order 1_5014 and the direct-line upper order 2_5015 indicate the hierarchical relation between equipment components of the same system. Specifically, for each equipment component, the value of the hierarchical group ID 5013 of an equipment component that is above the equipment component in question in hierarchy is stored as the direct-line upper order 1_5014. In the case where there are two upper-order equipment components above one equipment component, the values of the hierarchical group ID 5013 of the two equipment components are respectively stored as the direct-line upper order 1_5014 and the direct-line upper order 2_5015. If there are three or more upper-order equipment components above one equipment component, the hierarchical group configuration information table 501 may include more information about direct-line upper order (for example, direct-line upper order 3 (not shown)).

The other-line 1_5016 and the other-line 2_5017 indicate the interrelation between information processing equipment and facility equipment. Specifically, for each equipment component, the values of the hierarchical group ID 5013 of other-line equipment components that are associated with the equipment component in question (for example, a component of a power feed system equipment or a cooling system equipment that is associated with an information processing equipment component) are stored as the other-line 1_5016 and the other-line 2_5017. For example, for an information processing equipment component, the values of the hierarchical group ID 5013 of a component of power feed system equipment and a component of cooling system equipment that are associated with this information processing equipment component (i.e., an equipment component that supplies power to this information processing equipment component and an equipment component that cools this information processing equipment component) are stored as the other-line 1_5016 and the other-line 2_5017.

The values of the hierarchical group ID 5013 given as an example in FIG. 8 are described. The first two letters of the hierarchical group ID 5013 indicate the located hierarchy level or the equipment component type. For example, "ZZ" represents located hierarchy level, "SV" represents server, "ST" represents storage, "NW" represents network, "FD" represents power feed, "PD" represents power distribution unit, and "CL" represents cooling. The twelve-digit figure that follows indicates, in the unit of two digits from the highest order down, numbers for identifying a hierarchical group to which the equipment component belongs. The last two digits indicate a number for identifying the equipment component in the hierarchical group expressed by the twelve-digit figure. Each equipment component or each zone can therefore be identified uniquely based on the value of the hierarchical group ID 5013. In the following description, a server SV_132152_0, for example, means an equipment component (a server) associated with a value "SV_132152_0" of the hierarchical group ID 5013. All hierarchical groups to which an equipment component belongs can also be identified based on the value of the hierarchical group ID 5013. In the following description, the value of the hierarchical group ID 5013 is further used to identify, for each equipment component or each zone, a hierarchical group associated with the equipment component or the zone. For example, a hierarchical group associated with a partition ZZ_132000_0 is a hierarchical group made up of information processing equipment components within a partition that is associated with a hierarchical group identification number "132000" included in the hierarchical group ID 5013, components of power feed system equipment that supply power to these information processing equipment components (e.g., a switchboard in the partition), and components of cooling system equipment that cool these information processing equipment components (e.g., an air-conditioner in the partition).

For example, a rack whose hierarchical group ID 5013 is "ZZ_132150_0" is disposed in the first (=1) building, on the third (=3) floor, in the second (=2) partition, in the first (=1) rack row, in the fifth (=5) place. The server SV_132152_00 mounted at a place "2U" in this rack is connected to the first and second rack switches that are mounted on the same rack as the server, NW_132150_1 and NW_132150_2, receives a supply of power from the second power distribution unit of the rack, PD_132150_2, and is cooled by a cooling door CL_132150_1 of the rack.

A network system leading to the rack switch NW_132150_2 is constituted of the first rack row switch disposed in the rack row, NW_132100_1, the first partition switch disposed in the partition, NW_32000_1, and a core router NW_130000_1. This means that the server SV_132152_00 communicates to/from a device (not shown) outside the information processing system 10 via the rack switch NW_132150_2, the rack row switch NW_132100_1, the partition switch NW_132000_1, and the core router NW_130000_1.

A power feed system leading to the power distribution unit PD_132150_2 is constituted of a breaker FD_132150_2, a panelboard FD_132100_1, a switchboard FD_132000_1, and an uninterruptible power-supply system FD_130000_1. This means that power consumed by the server SV_132152_0 is supplied to the server SV_132152_0 from the uninterruptible power-supply system FD_130000_1 through the switchboard FD_132000_1, the panelboard FD_132100_1, the breaker FD_132150_2, and the power distribution unit PD_132150_2.

A cooling system leading to the cooling door CL_132150_1 is constituted of the second and third rack-type air-conditioners that are disposed in the rack row, CL_132100_2 and CL_132100_3, and the first and second air-conditioners that are disposed in the partition, CL_132000_1 and CL_132000_2. The air conditioner CL_132000_1 is provided with a refrigerant from a chiller CL_130000_1. This means that the air conditioner CL_132000_1 uses the refrigerant provided from the chiller CL_130000_1 to cool the air, while the air conditioner CL_132000_1, the rack-type air-conditioners CL_132100_2 and CL_132100_3, and the cooling door CL_132150_1 cooperate with one another to cool the server SV_132152_0.

By referring to the hierarchical group configuration information table 501, a hierarchical group to which an equipment component belongs can thus be identified for every equipment component in the information processing system, and the inclusive relation of hierarchical groups (i.e., which equipment component is higher or lower in hierarchy than which equipment component) can also be identified.

The hierarchical group configuration information table 501 of FIG. 8 corresponds to the hierarchical group configuration information 56 of FIG. 1. Of the information illustrated in FIG. 8, the information about the hierarchical group ID corresponds to the location information 57, and the information about the direct-line orders 1 and 2 and the other-lines 1 and 2 corresponds to the network information.

The hierarchical group operating information 447 is constituted of, for example, an information processing equipment hierarchical group operating information table 502, a network equipment hierarchical group operating information table 503, a power feeding facility equipment hierarchical group operating information table 504, and a cooling facility equipment hierarchical group operating information table 505.

FIG. 9A is an explanatory diagram of the information processing equipment hierarchical group operating information table 502 which is kept by the information processing system of the first embodiment of this invention.

The information processing equipment hierarchical group operating information table 502 (hereinafter, also referred to as information processing equipment table 502) includes an equipment ID 5021, an equipment name 5022, a hierarchical group ID 5023, maximum CPU resource utilization 5024, CPU resource utilization 5025, power consumption 5026, and a performance-to-power efficiency 5027. The equipment ID 5021, the equipment name 5022, and the hierarchical group ID 5023 are the same as the equipment ID 5011, the equipment name 5012, and the hierarchical group ID 5013, respectively, and a description thereof is omitted.

The maximum CPU resource utilization 5024 indicates, for each hierarchical group, the maximum value of total CPU resource utilization by all servers in the hierarchical group and, in the case where the servers all have the same performance, equals to the sum of operating clock counts of all CPUs of the servers. The CPU resource utilization 5025 is the amount of CPU resources actually used. The power consumption 5026 indicates for each hierarchical group the actual power consumption of all information processing equipment components within the hierarchical group.

The performance-to-power efficiency 5027 is the ratio of actual performance to power consumption, and is calculated by dividing the value of the CPU resource utilization 5025 by the value of the power consumption 5026. A larger value of the performance-to-power efficiency 5027 means that higher performance is accomplished at lower power consumption, and therefore is desirable.

In the example of FIG. 9A, operating information, such as the maximum CPU resource utilization 5024, the CPU resource utilization 5025, the power consumption 5026, and the performance-to-power efficiency 5027, about zones or equipment components from a building level ZZ_100000_0 to the server SV_132152_0, and about workload (virtual machine) allocated to this server, VM_XXXXXXXX, is compiled on a hierarchical group-by hierarchical group basis to be stored in the information processing equipment table 502. In this example, the values of resource utilization and other types of information about network equipment components out of information processing equipment components included in hierarchical groups are stored in the network equipment table 503 (see FIG. 9B) instead of the information processing equipment table 502. FIG. 9A shows only values related to the partition ZZ_132000_0 and omits other values. In practice, however, the table also stores values related to other zones, equipment components, and virtual machines than those of the partition ZZ_132000_0. The same applies to FIGS. 9B to 9D, which are described later. In other words, while FIG. 9A shows only values related to equipment components that belong to the same hierarchy level as the partition ZZ_132000_0, the table actually stores values related to all equipment components.

In the example of FIG. 9A, ξ, η, α, and a are stored as the maximum CPU resource utilization 5024, the CPU resource utilization 5025, the power consumption 5026, and the performance-to-power efficiency 5027, respectively, in association with the partition ZZ_132000_0. This means that the sum of operating clock counts of all CPU resources of all servers in the partition ZZ_132000_0 is ξ, that, out of the maximum resource utilization, the actual CPU resource utilization is η, and that the actual power consumption of all information processing equipment components in the partition ZZ_132000_0 is α. In this case, a=η/α is established.

FIG. 9B is an explanatory diagram of the network equipment hierarchical group operating information table 503 which is kept by the information processing system of the first embodiment of this invention.

The network equipment hierarchical group operating information table 503 (hereinafter, also referred to as network equipment table 503) stores data obtained by compiling operating information, such as maximum NW resource utilization, NW resource utilization, power consumption, and performance-to-power efficiency, for each hierarchical group of equipment components from the core router NW_130000_1 to the rack switch NW_132150_2.

Specifically, the network equipment table 503 includes an equipment ID 5031, an equipment name 5032, a hierarchical group ID 5033, maximum NW resource utilization 5034, NW resource utilization 5035, power consumption 5036, and a performance-to-power efficiency 5037. The equipment ID 5031, the equipment name 5032, and the hierarchical group ID 5033 are the same as the equipment ID 5011, the equipment name 5012, and the hierarchical group ID 5013, respectively, and a description thereof is omitted.

The maximum NW resource utilization 5034 indicates for each hierarchical group the maximum value of network resource utilization of a network equipment component in the hierarchical group and, for example, equals the value of the bandwidth of the network equipment component in question. In the case where one hierarchical group includes a plurality of network equipment components, the sum of the bandwidth values of those network equipment components may be used. The NW resource utilization 5035 is the amount of network resources actually used. In FIG. 9B, the network equipment component power consumption 5036 is included in the information processing equipment component power consumption 5026 of the associated hierarchical group. Network performance is considered as a factor of information processing performance, and the performance-to-power efficiency is calculated here based on the information processing equipment component power consumption 5026 instead of the network equipment component power consumption 5036.

The performance-to-power efficiency 5037 is the ratio of network equipment component actual performance to the information processing equipment component power consumption, and is calculated by dividing the value of the NW resource utilization 5035 by the value of the power consumption 5026. A larger value of the performance-to-power efficiency 5037 means that higher performance is accomplished at lower power consumption, and therefore is desirable.

In the example of FIG. 9B, ζ, ν, and b are stored as the maximum NW resource utilization 5034, the NW resource utilization 5035, and the performance-to-power efficiency 5037, respectively, in association with the partition switch NW_132000_1 in the partition ZZ_132000_0. In this case, b=ν/α is established.

FIG. 9C is an explanatory diagram of the power feeding facility equipment hierarchical group operating information table 504 which is kept by the information processing system of the first embodiment of this invention.

The power feeding facility equipment hierarchical group operating information table 504 (hereinafter, also referred to as power feeding facility equipment table 504) stores operating information data of each hierarchical group such as maximum power capacity, power capacity, feeding loss, and power sensitivity.

Specifically, the power feeding facility equipment table 504 includes an equipment ID 5041, an equipment name 5042, a hierarchical group ID 5043, a maximum power capacity 5044, a power capacity 5045, a feeding loss 5046, and a power sensitivity 5047. The equipment ID 5041, the equipment name 5042, and the hierarchical group ID 5043 are the same as the equipment ID 5011, the equipment name 5012, and the hierarchical group ID 5013, respectively, and a description thereof is omitted.

The maximum power capacity 5044 indicates for each power feeding facility equipment component the maximum value of the power capacity of the power feeding facility equipment component. The power capacity 5045 is the actually used power capacity (i.e., the actually supplied power). The feeding loss 5046 indicates for each power feeding facility equipment component the actual feeding loss of the power feeding facility equipment component.

The power sensitivity 5047 is the ratio of feeding loss to information processing equipment component power consumption. The power sensitivity 5047 is calculated by dividing the value of the feeding loss 5046 by the value of the power consumption 5026, and is also expressed by an expression (1/power conversion efficiency−1). A smaller power sensitivity value means a smaller feeding loss relative to information processing equipment component power consumption, and is therefore desirable.

In the example of FIG. 9C, β, φ, and c are stored as the maximum power capacity 5044, the feeding loss 5046, and the power sensitivity 5047, respectively, in association with the switchboard FD_132000_1 in the partition ZZ_132000_0. In this case, c=φ/α is established.

FIG. 9D is an explanatory diagram of the cooling facility equipment hierarchical group operating information table 505 which is kept by the information processing system of the first embodiment of this invention.

The cooling facility equipment table 505 stores operating information data of each hierarchical group such as maximum cooling capacity, cooling capacity, cooling power, and power sensitivity.

Specifically, the cooling facility equipment table 505 includes an equipment ID 5051, an equipment name 5052, a hierarchical group ID 5053, a maximum cooling capacity 5054, a cooling capacity 5055, cooling power 5056, and a power sensitivity 5057. The equipment ID 5051, the equipment name 5052, and the hierarchical group ID 5053 are the same as the equipment ID 5011, the equipment name 5012, and the hierarchical group ID 5013, respectively, and a description thereof is omitted.

The maximum cooling capacity 5054 indicates for each cooling facility equipment component the maximum value of the cooling capacity of the cooling facility equipment component. The cooling capacity 5055 is the actually used cooling capacity (i.e., the thermal load actually applied to the cooling facility equipment component). The cooling power 5056 indicates for each cooling facility equipment component the actual power consumption of the cooling facility equipment component.

The power sensitivity 5057 is the ratio of cooling power to information processing equipment component power consumption. The power sensitivity 5057 is calculated by dividing the value of the cooling power 5056 by the value of the power consumption 5026, and is also expressed by an expression (1/coefficient of performance). A smaller power sensitivity value means a smaller cooling power relative to information processing equipment component power consumption, and is therefore desirable.

In the example of FIG. 9D, r, φ, and d are stored as the maximum cooling capacity 5054, the cooling power 5056, and the power sensitivity 5057, respectively, in association with the air conditioner CL_132000_1 in the partition ZZ_132000_0. In this case, $d=\phi/\alpha$ is established.

The operation management unit 440 follows the operation policies 443 to control the hierarchical groups 410 to 413 based on the hierarchical group configuration information 446 an example of which is illustrated in FIG. 8 and the hierarchical group operating information 447 an example of which is illustrated in FIGS. 9A to 9D. The operation policies 443 define hierarchical group control procedures, for example, procedures illustrated in the flow chart of FIG. 10, 11, or 12, depending on the operation situation of the information processing system 400.

Figure 10:
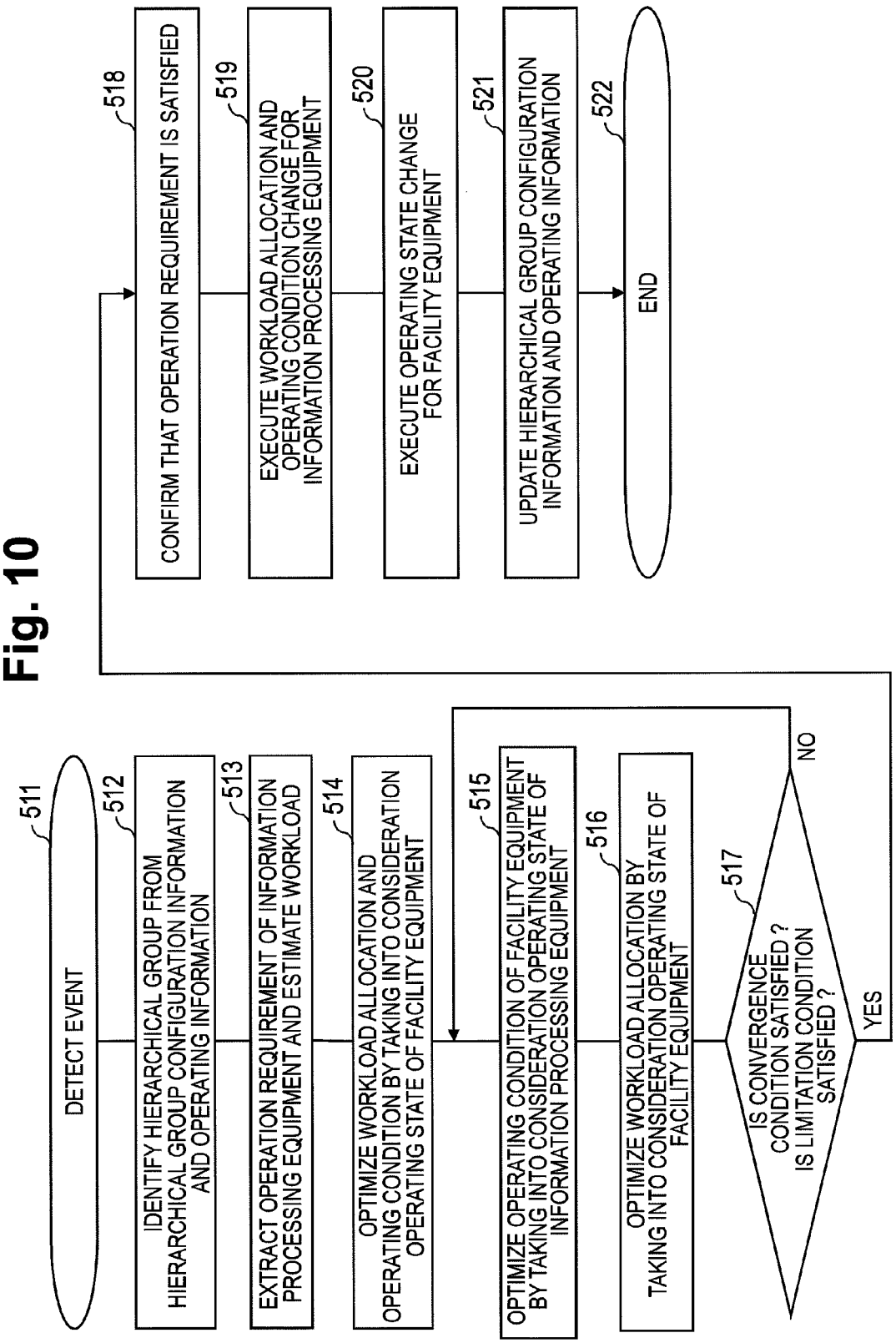
FIG. 10 is a flow chart illustrating an example of main control procedures executed for normal events in the first embodiment of this invention.

FIG. 10 is a flow chart illustrating an example of main control procedures executed for normal events in the first embodiment of this invention.

In the flow chart of FIG. 10, the operation management unit 440 detects an event in Step 511 through the event monitoring 442 from the operating plans 461 and 481, the configuration information 446, the configuration information 463, the configuration information 482, the operating information 447, the operating information 465, the operating information 484, the environment information 484, the input information 467, the input information 488, or the like. An event detected here is, for example, a monitored numerical value's reaching a level higher (or lower) than a threshold. More specifically, a detected event can be workload's exceeding a threshold, a monitored temperature's exceeding a threshold, or the like. Putting in a new job, the completion of a job, or the like may also be detected as an event.

When it is determined that the event detected in Step 511 is a trigger for the execution of control, the operation management unit 440 identifies in Step 512 a hierarchical group in which the detected event has occurred, based on the hierarchical group configuration information 446 and the operating information 447.

In Step 513, the operation management unit 440 then executes the operation requirement verification 451 and the workload estimation 452. Specifically, the operation management unit 440 refers to the operating plan 461 or the service level agreement 462 to extract operation requirements and an operation system configuration of information processing equipment in the hierarchical group identified in Step 512, and also refers to the configuration information 463 or the prediction information 465, which is a prediction made from the operating history, to estimate information processing resources namely, workload, necessary to satisfy the operation requirements.

In Step 514, the operation management unit 440 then executes the workload allocation optimization 453 and the operating condition optimization 455. Specifically, the operation management unit 440 obtains an optimal solution for the workload estimated in Step 513 for information processing equipment that satisfies the operation requirements extracted in Step 513, while taking into consideration the operating information 447 of the facility equipment in the identified hierarchical group, and further obtains an optimal solution for operating conditions of the information processing equipment. For example, the operation management unit 440 may obtain the performance-to-power efficiencies 5027 and 5037 and power sensitivities 5047 and 5057 of a plurality of lower-order hierarchical groups which belong to the identified hierarchical group to obtain an optimal solution for workload allocation in a manner that shifts the operation of a hierarchical group that has a relatively high power sensitivity 5047 or 5057 and a relatively low performance-to-power efficiency 5027 or 5037 to a hierarchical group that has a relatively low power sensitivity 5047 or 5057 and a relatively high performance-to-power efficiency 5027 or 5037. The destination to which workload is shifted may be determined by, for example, procedures illustrated in FIG. 12 which are described later.

In Step 515, the operation management unit 440 then executes the operating condition optimization 473. Specifically, the operation management unit 440 obtains an optimal solution for operating conditions of the facility equipment with the use of the environment analysis 471 and the operating simulator 472, while taking into consideration the optimal operating conditions of the information processing equipment based on the optimal workload allocation, which have been obtained in Step 514. This provides an optimal solution for operating conditions that are to be set to the power feed system and the cooling system when the workload allocation and operating conditions obtained in Step 514 are applied.

In Step 516, the operation management unit 440 then executes the workload allocation optimization 453 and the operating condition optimization 455 as in Step 514 while taking into consideration the optimal operating conditions of the facility equipment which have been obtained in Step 515. To give a more detailed description, when the optimal solution obtained in Step 515 is applied to the facility equipment, the power sensitivities 5047 and 5057 are changed as a result. In Step 516, the operation management unit 440 therefore executes the same processing as in Step 514 using the changed power sensitivities 5047 and 5057.

A description on concrete procedures for obtaining optimal solutions in Steps 514 to 516 is omitted because known methods can be used.

In Step 517, the operation management unit 440 then compares the optimal solution obtained in Step 514 and the optimal solution obtained in Step 156 to determine whether convergence conditions are satisfied or not and whether constraining conditions are satisfied or not. Convergence conditions may be determined as satisfied when, for example, the difference between the optimal solution obtained in Step 514 and the optimal solution obtained in Step 156 is smaller than a given threshold. Constraining conditions are set in advance and include, for example, a CPU resource utilization limit, a power feed capacity limit, and a cooling capacity limit. When the answer to the determination step is "no" (i.e., when at least one of the convergence conditions and the constraining conditions is not satisfied), the processing returns to Step 515 to repeat Steps 515 and 516 until convergence is achieved. When the answer to the determination step is "yes" (i.e., when the convergence conditions and constraining conditions are both satisfied), on the other hand, the processing proceeds to Step 518. In such cases where the optimization in Step 514 and the optimization in Step 515 are performed in an inclusive manner or top-down, the convergence determination and the repeated return from Step 517 to Step 514 may be omitted.

In Step 518, the operation management unit 440 re-confirms that the converged optimal solution satisfies the operation requirements obtained in Step 513.

In Step 519, the operation management unit 440 then performs the workload execution control 454 and the operating condition control execution 456 on the information processing equipment based on the converged optimal solution. The workload shift and operating condition change based on the obtained optimal solution are thus actually executed in the information processing equipment.

In Step 520, the operation management unit 440 then performs the operating condition control execution 474 on the facility equipment based on the converged optimal solution. The operating condition change based on the obtained optimal solution is thus actually executed in the facility equipment.

In Step 521, the operation management unit 440 then updates the configuration information 446 and operating information 447 of the hierarchical group where changes have occurred in Steps 519 and 520, and ends the processing in Step 522.

By following the flow chart of FIG. 10, optimization control in which information processing equipment and facility equipment of a hierarchical group cooperate with each other can be performed in response to an event.

Figure 11:
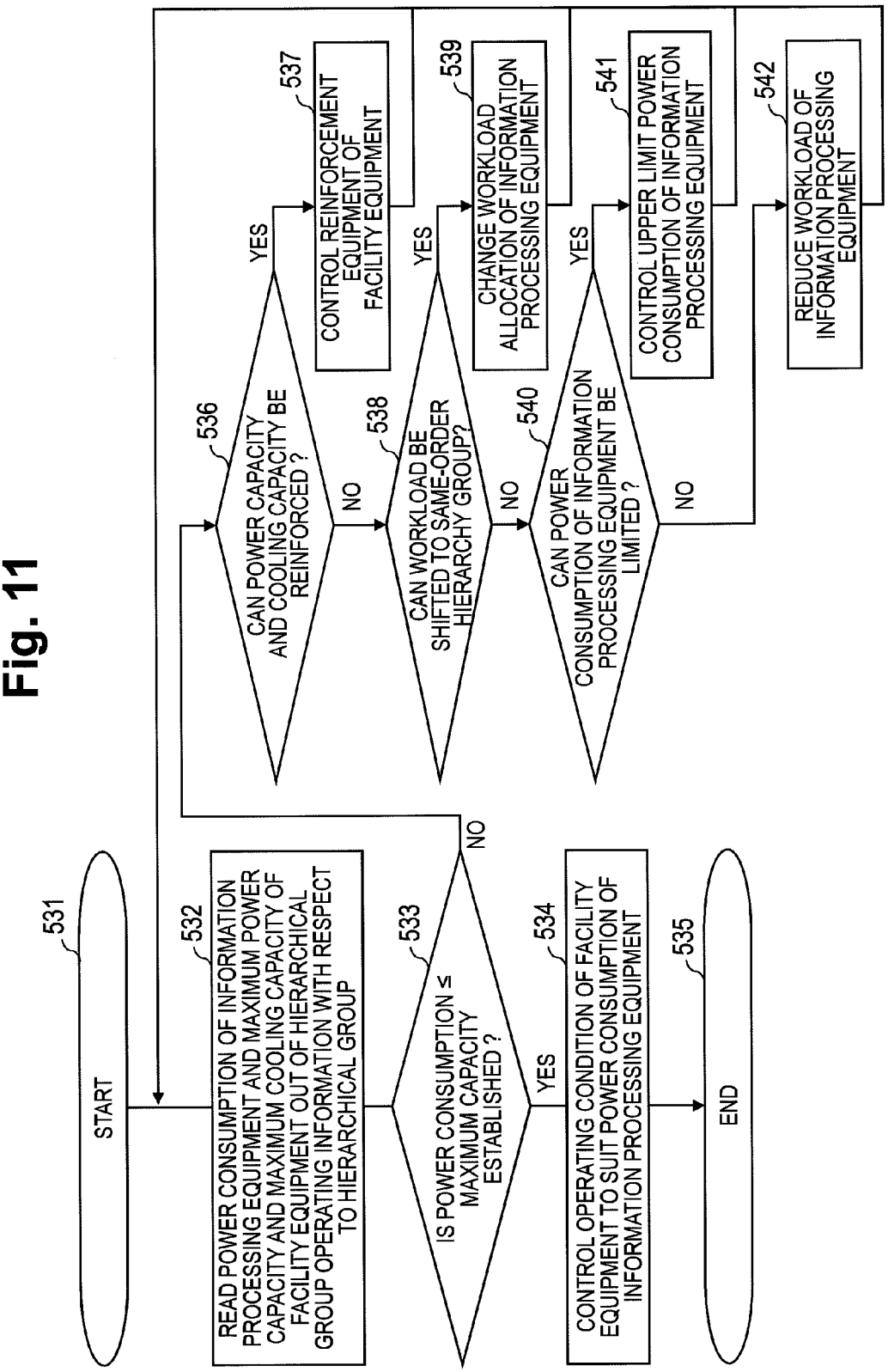
FIG. 11 is a flow chart illustrating an example of control procedures that are executed for a violation of constraining conditions in the first embodiment of this invention.

FIG. 11 is a flow chart illustrating an example of control procedures that are executed for a violation of constraining conditions in the first embodiment of this invention.

In the flow chart of FIG. 11, the operation management unit 440 executes Step 531 regularly, or starts Step 531 in accordance with the operating plans 461 and 481 or in response to an event.

In Step 532, the operation management unit 440 then reads out of the hierarchical group operating information 447 the power consumption of information processing equipment and the maximum power capacity or cooling capacity of facility equipment. To take as an example the hierarchical group of the partition ZZ_132000_0 shown in the hierarchical group operating information tables 502 to 505 of FIGS. 9A to 9D, the operation management unit 440 reads a total power consumption a of information processing equipment disposed in this partition, a maximum power capacity β of the switchboard FD_132000_1 associated with this partition, a maximum cooling capacity γ of the air conditioner CL_132000_1 disposed in this partition, and the like. In the case where a plurality of switchboards are disposed in the partition, the maximum power capacity 5044 is searched for with "FD_132000" as the search key, and a sum Σβ of the retrieved maximum power capacities 5044 is calculated. In the case where a plurality of air-conditioners, a plurality of rack-type air-conditioners, a plurality of cooling rear doors, or the like are disposed in the partition, the maximum cooling capacity 5054 is searched for with "CL_132" as the search key, and a sum Σγ of the retrieved maximum cooling capacities 5054 is calculated.

In Step 533, the operation management unit 440 then determines whether the power consumption is equal to or less than the maximum power capacity or whether or not the power consumption is equal to or less than the maximum cooling capacity. In the example of FIGS. 9A to 9D, the operation management unit 440 determines whether or not α≤β (or Σβ) or α≤γ (or Σγ) is established.

When the answer to the determination step S533 is "yes" (i.e., when the power consumption is equal to or less than the maximum power capacity and equal to or less than the maximum cooling capacity), the processing proceeds to Step 534. In Step 534, the operation management unit 440 performs the operating condition optimization 473 and the operating condition control execution 474 on the facility equipment, to optimize the power capacity and cooling capacity to the power consumption of the information processing equipment, and thereby minimize feeding loss and cooling power. In Step 535, the processing is ended.

When the answer to the determination step 533 is "no" (i.e., when the power consumption exceeds the maximum power capacity or the maximum cooling capacity), a failure such as a cutoff of power supply due to the activation of a breaker or overheating of an information processing equipment component is expected to happen in the hierarchical group that is being processed by the processing of FIG. 11. The operation management unit 440 therefore executes procedures for avoiding this kind of failure. In the example of FIG. 11, out of different procedures for avoiding the failure, those that do not affect the processing of operations by information processing equipment components are executed preferentially.

Specifically, the operation management unit 440 determines in Step 536 whether or not the power capacity or the cooling capacity can be reinforced. For example, in the case where the hierarchical group that is being processed includes auxiliary power feed equipment that can be used but is not in use at present, it is determined that the power capacity can be reinforced. In the case where the hierarchical group includes cooling equipment that can be used but is not in use at present, it is determined that the cooling capacity can be reinforced.

When the answer to the determination step 536 is "yes" (i.e., when the power capacity or the cooling capacity can be reinforced), the operation management unit 440 controls the equipment that reinforces the facility equipment (for example, starts using the auxiliary power feed or cooling equipment) in Step 537, and returns to Step 532. Then, the failure can be avoided while maintaining the processing capacity of the information processing equipment (i.e., without affecting operations).

When the answer to the determination step 536 is "no" (i.e., when the power capacity or the cooling capacity cannot be reinforced), the operation management unit 440 determines in Step 538 whether or not workload can be shifted to a hierarchical group of the same order as the hierarchical group that is being processed. The destination of workload shift may be determined by, for example, procedures illustrated in FIG. 12.

When the answer to the determination step 538 is "yes" (i.e., when workload can be shifted), the operation management unit 440 changes the workload allocation of the information processing equipment in Step 539, and returns to Step 532. In this case, too, the failure can be avoided while maintaining the processing capacity of the information processing equipment (i.e., without affecting operations).

When the answer to the determination step 538 is "no" (i.e., when the workload cannot be shifted), the operation management unit 440 determines in Step 540 whether or not the power consumption of the information processing equipment can be limited. For example, in the case where a server included in the information processing equipment has a function of reducing power consumption by lowering the clock frequency of its CPU, it is determined that the power consumption of the information processing equipment can be limited. Limiting the power consumption of the information processing equipment is determined as possible also when the information processing equipment includes storage that has a function of reducing power consumption by lowering the disk revolution speed (or stopping the revolution of a disk that is not accessed).

When the answer to the determination step 540 is "yes" (i.e., when the power consumption of the information processing equipment can be limited), the operation management unit 440 controls the power consumption in Step 541 and returns to Step 532. In this case, the processing performance of the information processing equipment is lowered and, although operations are affected, the failure is avoided.

When the answer to the determination step 540 is "no" (i.e., when the power consumption of the information processing equipment cannot be limited), the operation management unit 440 reduces the workload of the information processing equipment in Step 542, and returns to Step 532. For example, the operation management unit 440 may stop low-priority operations for the time being, to be executed later. In this case, the failure is avoided although operations are affected.

By following the flow chart of FIG. 11, the power capacity and cooling capacity of facility equipment are conformed to the power consumption of information processing equipment, and the feeding loss and cooling power of the facility equipment are reduced while avoiding a failure or other consequences of a violation of constraining conditions.

Figure 12:
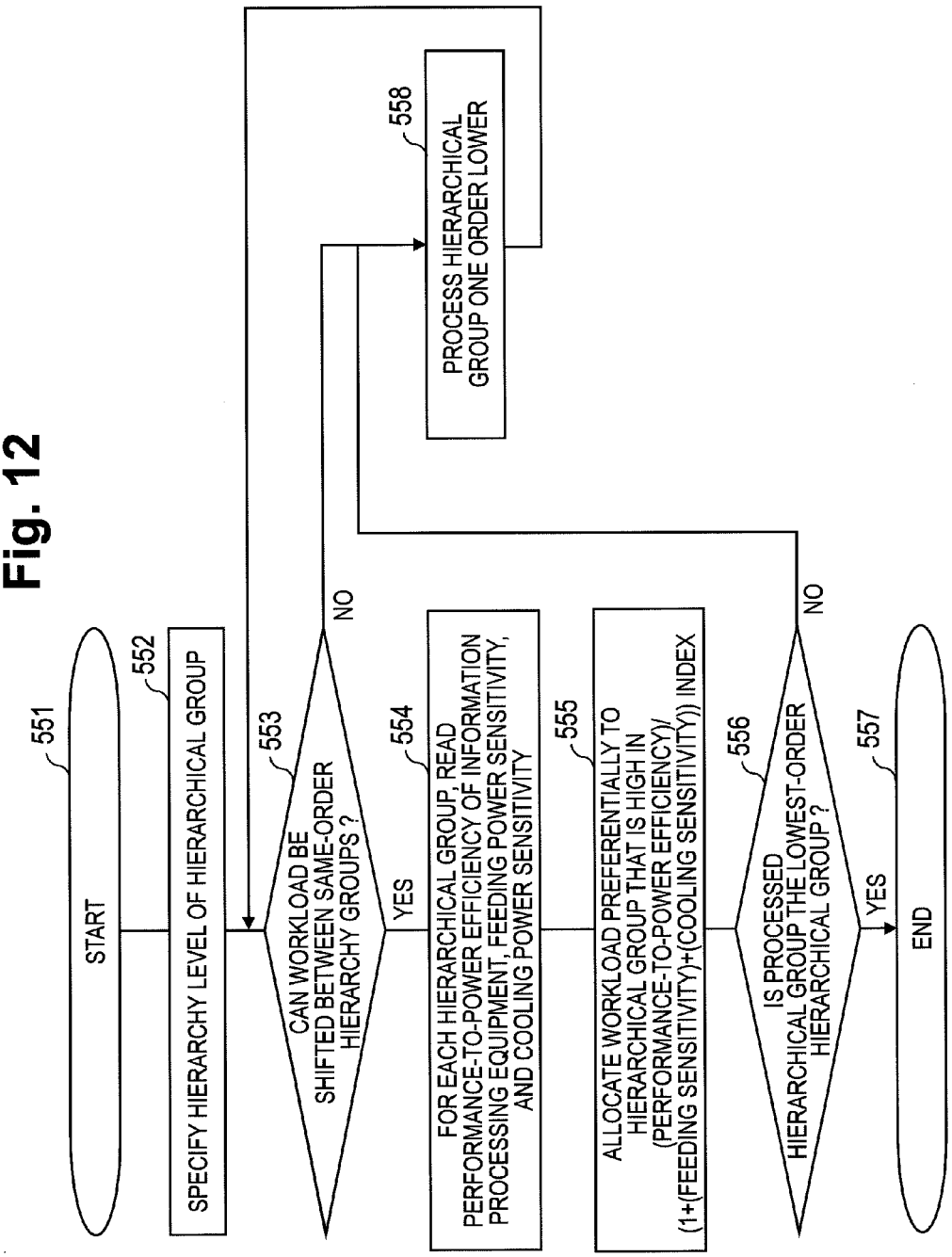
FIG. 12 is a flow chart illustrating an example of control procedures that are executed to optimize work load allocation in the first embodiment of this invention.

FIG. 12 is a flow chart illustrating an example of control procedures that are executed to optimize work load allocation in the first embodiment of this invention.

In the flow chart of FIG. 12, the operation management unit 440 executes Step 551 regularly, or starts Step 551 in accordance with the operating plans 461 and 481 or in response to an event.

In Step 552, the operation management unit 440 then specifies the hierarchy level of a hierarchical group. For example, when an operation system is configured in a partition and the type of failure described with reference to FIG. 11 is expected to happen in the partition, a hierarchy level associated with this partition may be specified. The specified hierarchy level is an initial value for the hierarchy level of the processing target of FIG. 12 described below.

In Step 533, the operation management unit 440 then executes the operation requirement verification 451 and the workload estimation 452 to determine whether or not workload can be shifted between hierarchical groups of the same level as the processing target hierarchy level. Whether or not workload can be shifted may be determined based on, for example, predetermined operation requirements. Operation requirements are, for example, always using a specific information processing equipment component for one operation, and guaranteeing a given level of information processing performance for another operation, and may be set by the type of the operation, agreement with users, or the like.

When the answer to the determination step 553 is "yes", the operation management unit 440 reads, in Step 554, for each of the same-order hierarchical groups, the performance-to-power efficiencies 5027 and 5037 of the information processing equipment and the feeding power sensitivity 5047 and cooling power sensitivity 5057 of the facility equipment. To take as an example the hierarchical group of the partition ZZ_132000_0 of FIG. 9, a performance-to-power efficiency a of the information processing equipment disposed in this partition, a performance-to-power efficiency b of the partition's network equipment, a power sensitivity c of the partition's power feeding facility equipment, a power sensitivity d of the partition's cooling facility equipment, and the like. When CPUs, for example, are dominant in the processing performance of the information processing equipment (e.g., when an operation that applies load mainly to the CPUs is allocated), the performance-to-power efficiency a is expressed by the ratio of the CPU resource utilization $\eta$ to the power consumption $\alpha$, $\eta/\alpha$. When networks are dominant (e.g., when the allocated operation applies load mainly to network equipment), on the other hand, the performance-to-power efficiency b is expressed by the ratio of the NW resource utilization v to the power consumption $\alpha$, $v/\alpha$. The feeding power sensitivity c is the ratio of the feeding loss $\phi$ of the switchboard FD_132000_1, which is associated with the partition, to the power consumption $\alpha$, $\phi/\alpha$, and the same can be applied when a plurality of switchboards are disposed in the partition. The cooling power sensitivity d is the ratio of the cooling power $\psi$ of the air conditioner CL_132000_1 to the power consumption $\alpha$, $\psi/\alpha$, and the same can be applied when a plurality of air-conditioners, a plurality of rack-type air-conditioners, a plurality of cooling rear doors, or the like are disposed in the partition.

In Step 555, the operation management unit 440 then executes the workload allocation optimization 453 to allocate workload preferentially to a hierarchical group that has a high value of an index expressed as performance-to-power efficiency/(1+feeding power sensitivity+cooling power sensitivity). A hierarchical group that has the highest value of this index is thus selected and workload is allocated to the hierarchical group. A higher value of this index means higher performance of an information processing equipment component relative to the sum of the power consumption of the information processing equipment component, the power dissipation of a power feed equipment component, and the power consumption of a cooling equipment component. In other words, a hierarchical group that has a higher value of this index can process heavier workload with less power and is therefore preferentially selected as a group to which workload is allocated.

In the example of FIGS. 9A to 9D, the operation management unit 440 ranks hierarchical groups in descending order of an index expressed as a/(1+c+d) in the case of an operation where load on CPUs is dominant, and an index expressed as b/(1+c+d) in the case of an operation where load on networks is dominant. For example, in the case where the partition ZZ_132000_0 is selected as the highest ranking (i.e., most preferential) hierarchical group, the operation management unit 440 allocates workload to information processing equipment components in the partition ZZ_132000_0 within a range that does not exceed the maximum CPU resource utilization $\xi$ or the maximum NW resource utilization $\zeta$.

In Step 556, the operation management unit 440 then determines whether or not the hierarchy level that is being processed (i.e., the hierarchy level specified in Step 552, or the hierarchy level that is reached as a result of level lowering in Step 558, which is described later) is the lowest hierarchy level.

When the answer to the determination step 556 is "yes", the processing ends in Step 557.

When the answer to the determination step 553 is "no", and when the answer to the determination step 556 is "no", the operation management unit 440 processes in Step 558 a hierarchy level one level lower than that of the currently processed hierarchical group. Thereafter, the processing returns to Step 553 to repeat the workload allocation optimization 453 and, ultimately, an information processing equipment component to which workload is to be allocated is identified. If workload cannot be shifted even though it is determined in Step 553 that the hierarchy level that is being processed is the lowest hierarchy level, the flow is terminated as an exceptional measure.

By following the flow chart of FIG. 12, an optimal solution can be obtained for workload allocation that minimizes the total power, which combines the power consumption of information processing equipment with the feeding loss and cooling power of facility equipment.

According to the operation management method for the information processing system 400 illustrated in FIG. 7 to FIG. 12, the hierarchical group configuration function 445 of the operation management unit 440 configures the hierarchical groups 410 to 413, and the control functions 450 and 457 of the operation management unit 440 perform optimization control on the information processing equipment 420 to 423 and the facility equipment 430 to 433 for each of the hierarchical groups 410 to 413 separately, based on the hierarchical group configuration information 446 and the hierarchical group operating information 447. The information processing performance is thus improved relative to the total power consumption of the information processing system 400 which includes information processing equipment and facility equipment.

The example of the configuration information table 501 illustrated in FIG. 8 and the example of the operating information tables 502 to 505 illustrated in FIGS. 9A to 9D show designs that facilitate hierarchical group-by-hierarchical group control by clarifying hierarchy systems, but the table configurations and data contents may be modified to suit the database design or the control target. The examples of control procedures illustrated in FIGS. 10 to 12 provide operation policies that are efficient in basic operation, but may be suited to the specifics of an operation, the situation operation, or the like by modification or an addition of a new policy. An added operation policy may be registered in the operation policies 443.

The operation management unit 440 can be implemented as, for example, a server that includes as illustrated in FIG. 1 the processor 52, the memory 53, a disk (not shown), the interface 51, and others. The integrated operation management platform 441, the hierarchical group control function 444, and the like can be implemented as programs stored in the memory (e.g., the hierarchical group operating information gathering program 54 and the hierarchical group control program 55). Accordingly, the processing procedures that are executed by the respective functions of the operation management unit 440 in the description given above are actually executed by the processor 52, which executes programs stored in the memory 53. Desirably, Ethernet is employed for interfaces of the information processing equipment 420 to 423 and the facility equipment 430 to 433, and SNMP is used for monitoring and operating control of these equipment. In the case where the information processing equipment 420 to 423 constitute a virtualized resource pool, virtualized software can be utilized in the workload control execution 454, the configuration monitoring 464, the operating monitoring 466, and the like.

FIG. 13 is a hierarchical group configuration diagram illustrating the operation management method for the information processing system according to the first embodiment of this invention.

Hierarchical groups of FIG. 13 include, from the upper level down, H1 (600) on the first hierarchy level, H2a (610) on the second hierarchy level, H3a (620) and H3b (621) on the third hierarchy level, H4a to H4d (630 to 633) on the fourth hierarchy level, H5a to H5h (640 to 647) on the fifth hierarchy level, and H6a to H6x (650 to 657) on the sixth hierarchy level.

The inclusive relation between the hierarchical groups is as illustrated in FIG. 13. Specifically, H5a (640) includes H6a to H6c (650), H5b (641) includes H6d to H6f (651), H5c (642) includes H6g to H6i (652), H5d (643) includes H6j to H6l (653), H5e (644) includes H6m to H6o (654), H5f (645) includes H6p to H6r (655), H5g (646) includes H6s to H6u (656), and H5h (647) includes H6v to H6x (657). H4a (630) includes H5a (640) and H5b (641), H4b (631) includes H5c (642) and H5d (643), H4c (632) includes H5e (644) and H5f (645), and H4d (633) includes H5g (646) and H5h (647). H3a (620) includes H4a (630) and H4b (631), H3b (621) includes H4c (632) and H4d (633), H2a (610) includes H3a (620) and H3b (621), and H1 (600) includes H2a (610).

The hierarchical group H1 (600) and the hierarchical groups below H1 correspond to, for example, the hierarchical group 410 of FIG. 7 and the hierarchical groups below 410. An operation management unit (e.g., the operation management unit 440 of FIG. 7) is connected to the hierarchical group H1 (600), but is omitted from FIG. 13.

When operation policies as those of FIGS. 10 to 12 are applied, hierarchical control is accomplished by setting, in advance, to these hierarchical groups, procedures for transmitting a notification or an instruction to upper-order, or same-order, or lower-order hierarchical groups and procedures for receiving a notification or an instruction from upper-order, or same-order, or lower-order hierarchical groups, in addition to operation procedures of the hierarchical groups themselves.

For example, in the case where the workload shift destination of H4a (630) is searched for and the workload is to be allocated to H4c (632) as a result, there are several possible hierarchical search routes depending on operation policies. In the case of a search route 660, for example, the operation management unit 440 starts the search from the highest-order group H1 (600), sequentially searches lower-order hierarchical groups, figures out that the groups H2a (610) and H3b (621) include an available shift destination, and ultimately allocates the workload to the available shift destination, H4c (632). An available shift destination is a hierarchical group that can be the destination of a shift of workload from H4a (630), in other words, a hierarchical group to which the workload can be added. Whether or not a hierarchical group can be a workload shift destination may be determined by the procedures described with reference to FIGS. 10 to 12. For example, when adding workload to a hierarchical group does not violate constraining conditions (see Step 517 of FIG. 10), and does not cause the power consumption to exceed the maximum capacity (see Step 533 of FIG. 11), the hierarchical group may be determined as a possible workload shift destination. Alternatively, a hierarchical group that has, as the index of Step 555 of FIG. 12, a value higher than a given threshold may be determined as an available workload shift destination.

In the case of a route 661, the operation management unit 440 starts the search from H4a (630), and sequentially traces the route to an upper-order group H3a (630) and then H2a (610) above H3a. When it is determined as a result that H2a (610) includes an available shift destination, the operation management unit 440 sequentially searches H3b (621) below H2a (610) and H4c (632) below H3b, and allocates workload to H4c (632), which is the available shift destination.

In the case of a route 662, the operation management unit 440 starts the search from H4a (630), next searches H4b (631), proceeds to similarly search hierarchical groups of the same order as H4a (630) sequentially, and determines H4c (632) as an available shift destination.

Which of the search routes 660, 661, and 662 is efficient depends on the configurations of information processing equipment and facility equipment, the operation system configuration, operation requirements, and the like. It is therefore advisable to control the search with operation policies, such as selecting the route 660 when the extent of search is expected to be wide, and selecting the route 661 or the route 662 when an available shift destination is expected to be near. Operation policies may also set in advance a hierarchical group that is to serve as an evacuation destination for other operations than routine operations, such as an unexpected operation or maintenance work, in order to save trouble.

An example is discussed in which, in FIG. 13, an operation system 670 is allocated to H5a (640) to H5c (642), an operation system 671 is allocated to H61, which is a part of H5d (643), and to others, an operation system 672 is allocated to H5e (644), an operation system 673 is allocated to H6q and H6r, which are a part of H5f (645), and to others, and an operation system 674 is allocated to H6s, H6t, H6v, and H6w, spanning H5g (646) and H5h (647). A single operation system corresponds to a physical resource or virtual resource of an information processing equipment component that is allocated to execute one operation or a plurality of correlated operations. The allocation of an information processing equipment component, a virtual machine, or the like to an operation system is stored in the configuration information 463 of FIG. 7A, and an operation system and a hierarchical group are associated with each other by the configuration information 463 and the hierarchical group configuration information 446.

For example, from an information processing resource pool, information processing equipment or virtual resources are distributed dynamically to meet operation system requirements. Requirements about the processing performance, resource utilization, operating state, redundancy, and the like of information processing equipment change depending on operation services such as mission-critical operations and best-effort operations, and requirements about capacity tolerance, redundancy, and the like of facility equipment, too, change accordingly. It is therefore necessary to control information processing equipment and facility equipment from the standpoints of hierarchical group and operation system both. When operation groups are allocated in the manner illustrated in FIG. 13, the operation management unit 440 collects operating information of information processing equipment on an operation system-by-operation system basis, and controls information processing equipment and facility equipment based on the association relation between the hierarchical group configuration and the operation system configuration, and on hierarchical group operating information and operation system operating information. By controlling an operation system from a hierarchical group that includes the operation system, operating information that provides an overview of the entire operation system is extracted, and running the operation system in a manner that satisfies operation requirements is made easier. For example, the operation system 670 is controlled from the hierarchical group H3a (620), the operation system 671 is controlled from H5d (643), the operation system 672 is controlled from H5e (644), the operation system 673 is controlled from H5f (645), and the operation system 674 is controlled from H4d (633).

According to the operation management method for the information processing system which has been described with reference to FIG. 13, efficient hierarchy control is accomplished by setting, as operation policies, operation procedures between hierarchical groups, and operation services and operation efficiency can be managed in a balanced manner by positioning operation systems regarding hierarchical groups. Operation policies and the operation system configuration should be conformed to the hierarchical group configuration, operation requirements, and the like, and are not limited to the example of the search routes 660 to 662 and the example of the operation systems 670 to 674 which have been described here.

FIGS. 14A to 14D are diagrams of a graphical user interface screen illustrating the operation management method for the information processing system according to the first embodiment of this invention.

A display screen 700 of information processing system integrated operation management is roughly broken into a menu bar 701, an information processing system configuration display area 702, a hierarchical group operating information display area 704, and a hierarchical group operation transition graph display area 707.

The information processing system configuration display area 702 displays the hierarchical group configuration in the form of hierarchy tree. The display screen 700 is displayed on a display device (not shown) of the operation management unit 440. When the system operation manager operates a "+" box, the tree is expanded to display lower-order hierarchical groups. When the system operation manager operates a "−" box, the tree is collapsed to display only upper-order hierarchical groups. The "+" box and the "−" box are operated by, for example, operating an input device (not shown) of the operation management unit 440 (e.g., by clicking with a mouse). The same applies to other operations on the display screen 700 in this embodiment, such as checking a checkbox which is described later.

Figure 14B:
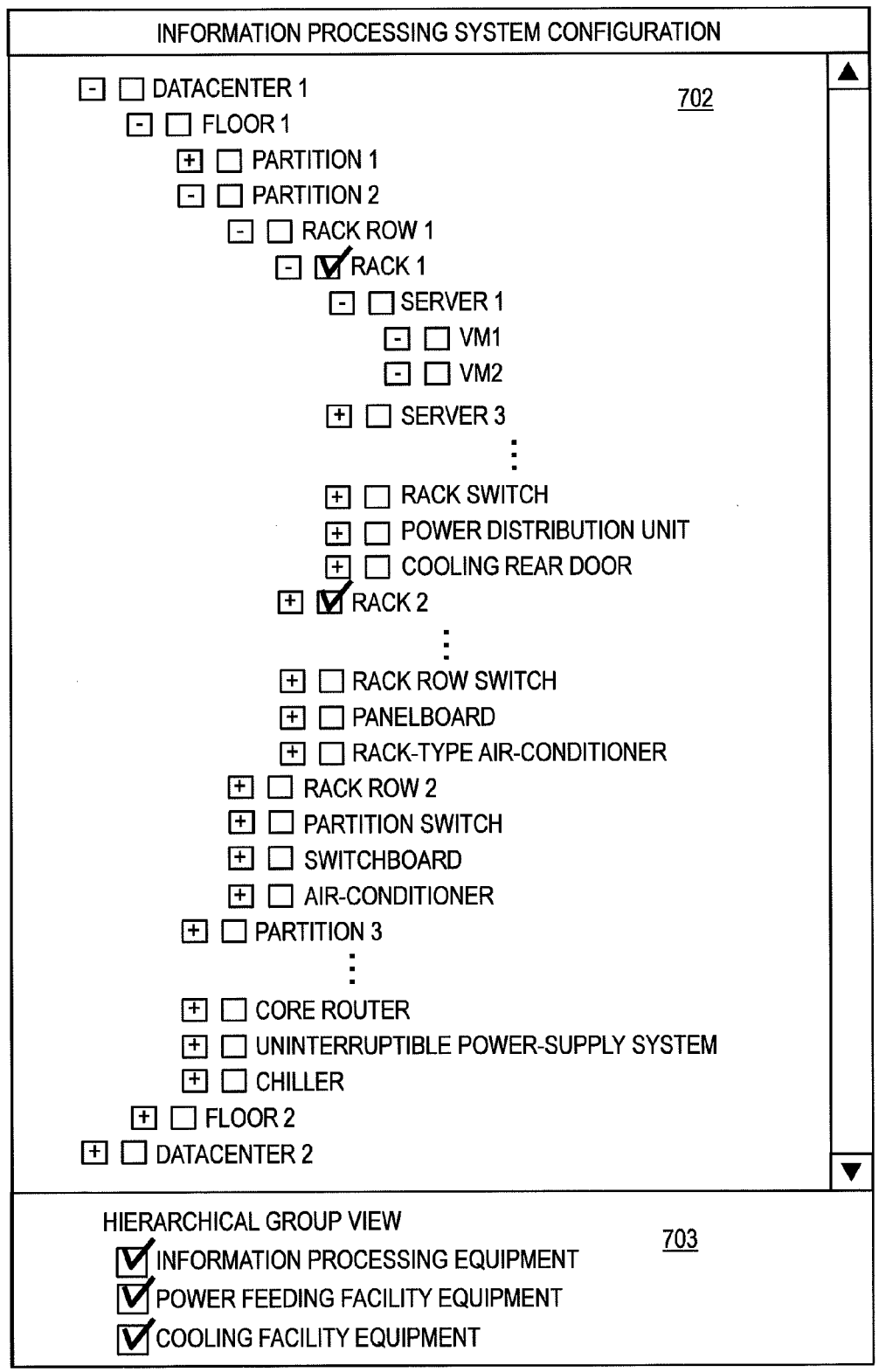

For each of information processing equipment, power feeding facility equipment, and cooling facility equipment, whether to display the equipment on the tree can be selected by operating hierarchical group view checkboxes in an area 703 (the checkboxes are all checked in FIG. 14B). Checking a checkbox on the tree causes the display areas 704 and 707 to display operating information of the selected hierarchical group (a rack 1 and a rack 2 are checked in FIG. 14B).

An area 705 within the hierarchical group operating information display area 704 displays, in a table format, operating information about a hierarchical group selected in the display area 702. Display items of the table and the time range of display items can be selected from an item selection pull-down menu and a time selection pull-down menu that are displayed in an area 706. In FIG. 14C, CPU utilization (in GHz), CPU utilization (in percentage), memory utilization, IT power consumption, facility equipment power consumption, and performance-to-power efficiency are selected as display items, and "history −00:00" and "prediction +00:00" are selected as time range, and present values are displayed. In the case where a time specified as history and a time specified as prediction do not match, average values in that time range are displayed and, in the case where the two match, instantaneous values at that time are displayed.

Figure 14D:
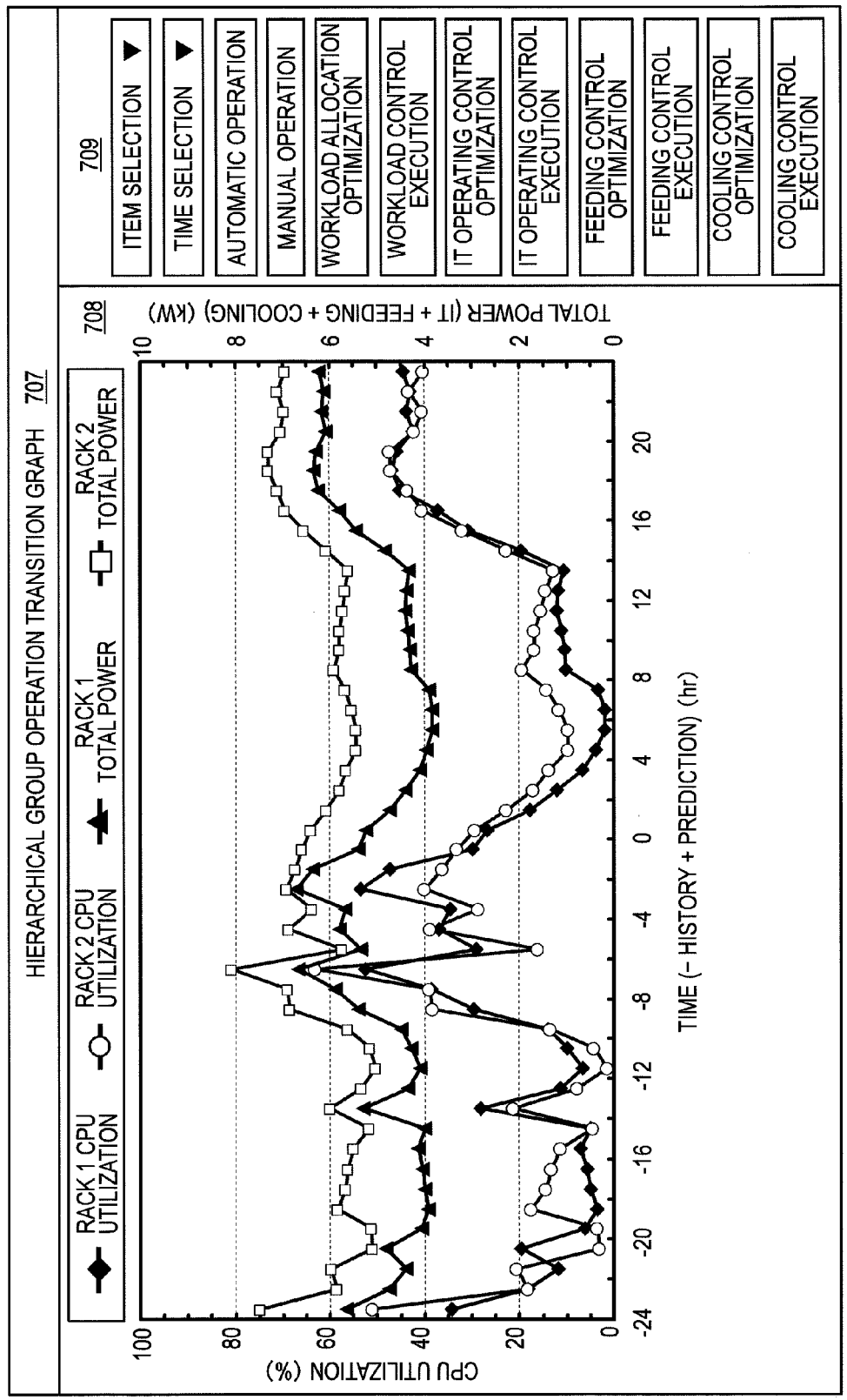

An area 708 within the hierarchical group operation transition graph display area 707 displays a transition graph of operating information about a hierarchical group selected in the display area 702. What is to be represented by a vertical axis of the graph and the time range can be selected from an item selection pull-down menu and a time selection pull-down menu that are displayed in an area 709. In FIG. 14D, CPU utilization (in percentage) is selected for the left hand-side vertical axis, total power [IT+feeding+cooling] is selected for the right hand-side vertical axis, and "history −24 hours" and "prediction +24 hours" are selected as a time range. The "−" side of the graph shows history values, present values are shown at 0, and the "+" side of the graph shows predicted values.

The CPU utilization (in GHz) displayed in the area 705 is the sum of CPU resource utilization of a plurality of servers mounted on the rack 1 or the rack 2. In FIG. 14D, the CPU resource utilization (in GHz) is displayed as a value obtained by multiplying the operating clock frequency by CPU utilization (in percentage) and, when performance varies among the servers, standardization is executed. Performance-to-power efficiency is a value obtained by dividing the CPU utilization (in GHz) by the sum of IT power consumption and facility equipment power consumption, namely, total power. A comparison between the rack 1 and the rack 2 about the performance-to-power efficiency in the area 705 and about the CPU utilization (in percentage) and the total power in the area 708 shows that the rack 1 is higher in performance-to-power efficiency and smaller in total power than the rack 2. In this case, the CPU utilization (in percentage) of the rack 1 is still low and it is therefore determined that shifting workload of the rack 2 to the rack 1 is beneficial for power saving.

In this manner, a hierarchical group whose operation management should be reviewed and information processing equipment and facility equipment that belong to the hierarchical group can be spotted from the hierarchical group operating information 704 and the hierarchical group operation transition graph 707. To review, the operation manager may operate an automatic execution button in the area 709. Alternatively, the operation manager may operate a manual execution button to perform operation (load) allocation optimization, IT operating control optimization, feeding control optimization, or cooling control optimization. The operation manager then checks prediction results displayed in the area 708 in the form of graph, and performs workload control execution, IT operating control execution, feeding control execution, or cooling control execution as necessary.

According to the operation management method for the information processing system which has been described with reference to FIGS. 14A to 14D, by using the graphical user interface screen 700 of information processing system integrated operation management, the operation situation of each hierarchical group is grasped visually and a problem in operation management can be spotted and dealt with at an early stage. This helps the operation manager and has an effect of improving operation efficiency. What is important in this operation management method is to display configuration information and operating information of each group in association with each other, and the effect is not exclusive to the exact screen configuration illustrated in FIGS. 14A to 14D.

When operation systems are associated with hierarchical groups as illustrated in FIG. 13, the screen 700 may be designed to add the operation systems to the tree of the area 702 and to display operating information of the operation systems in the table of the area 705 and the graph of the area 708. Then the method of FIGS. 14A to 14D realizes operation management in which hierarchical groups and operation systems cooperate with each other, and contributes to improvements in operation services and operation efficiency. With respect to operation systems, the method can be made further useful by displaying, as a productivity index, instead of performance-to-power efficiency, performance-to-energy efficiency such as the turnaround time of operation processing or workload amount (load×time) relative to the power consumption (power×time) of information processing equipment and facility equipment that are associated with the operation systems.

Second Embodiment

Figure 15:
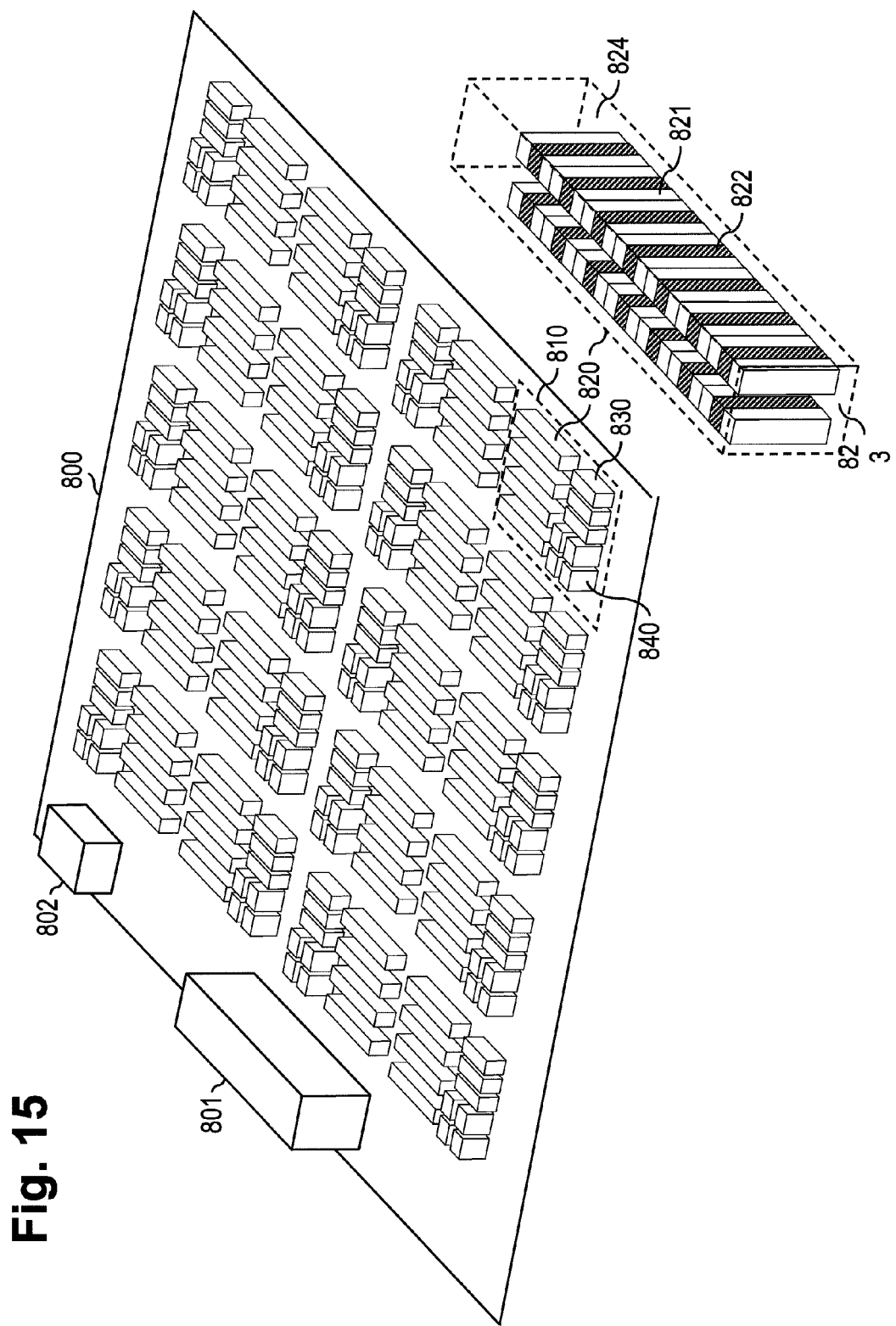
FIG. 15 is a system configuration diagram illustrating an operation management method for an information processing system according to a second embodiment of this invention.

FIG. 15 is a system configuration diagram illustrating an operation management method for an information processing system according to a second embodiment of this invention.

An information processing system 800 (a site) of Embodiment 8 is constituted of an aggregation of container datacenters 820, which are arranged in the unit of partitions 810. The partitions 810 are each constituted of four container datacenters 820, power feed equipment 830, which includes an uninterruptible power-supply system and the like to supply power to the datacenters 820, and cooling equipment 840, which includes a chiller and the like to supply a refrigerant to the datacenters 820. Although omitted from FIG. 15, an operation management unit similar to the operation management unit 440 of the first embodiment is disposed in an operation management center 801. The operation management unit manages the container datacenters 820, and substation equipment 802 supplies power to the power feed equipment 830. In each of the container datacenters 820, information processing equipment racks 821 and rack-type air-conditioners 822 form two rack rows, and a cold aisle 823 and an anteroom 824 are provided.

The hierarchy of hierarchical groups has, from the upper level down, the first hierarchy level which is associated with the site 800, the second hierarchy level which is associated with the partitions 810, the third hierarchy level which is associated with the container datacenters 820, the fourth level which is associated with the racks 821, and the fifth hierarchy level which is associated with information processing equipment components mounted on the racks 821. The substation equipment 802 is associated with the first hierarchy level, the power feed equipment 830 and the cooling equipment 840 are associated with the second hierarchy level, and the rack-type air conditioners 822 are associated with the third hierarchy level. The interior of each of the container datacenters 820 is a relatively small, closed space, and there is no air-conditioner that is associated with the partitions 810. Therefore, hierarchical groups associated with rack rows are not provided in the second embodiment.

According to an operation management method for the information processing system of the second embodiment, by defining hierarchical groups, hierarchical operation management similar to the management of a datacenter inside a building which has been described in the first embodiment is accomplished in the information processing system 800 constituted of the container datacenters 820. It is also self-evident that the methods allows the information processing system 800 to flexibly adapt to the expansion of the site 800, an addition of more container datacenters 820, and the like.

Third Embodiment

Figure 16:
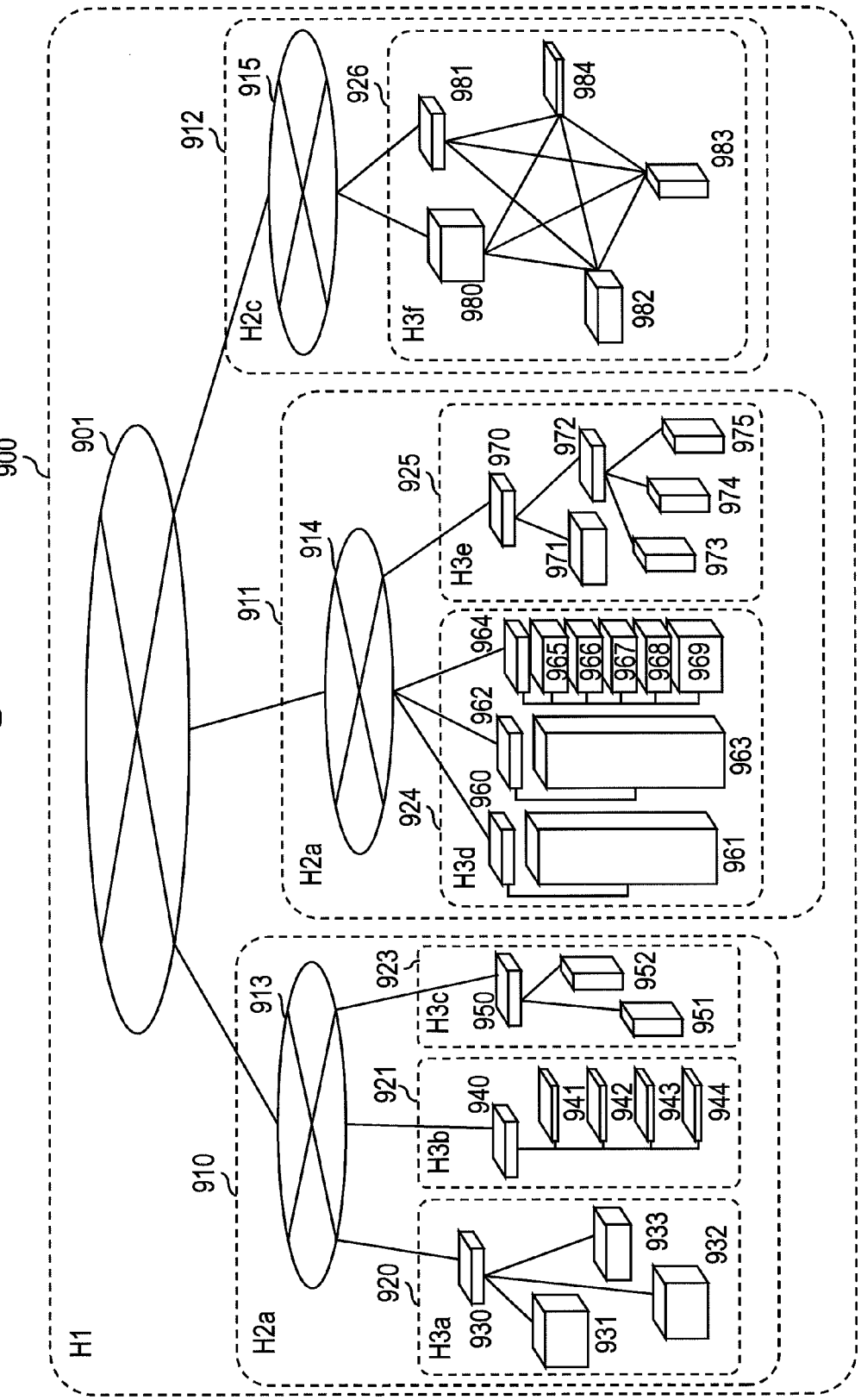
FIG. 16 is a system configuration diagram illustrating an operation management method for an information processing system according to a third embodiment of this invention.

FIG. 16 is a system configuration diagram illustrating an operation management method for an information processing system according to a third embodiment of this invention.

An information processing system 900 of the third embodiment is constituted of information processing equipment components that are connected to one another via a wide area network 901 and local area networks 913 to 915. Hierarchical groups include, from the upper level down, H1 (900) which is associated with the first hierarchy level, H2a to H2c (910 to 912) which are associated with the second hierarchy level, and H3a to H3f (920 to 926), which are associated with the third hierarchy level.

The hierarchical group H3a (920) is made up of a switch 930 and information processing equipment components 931 to 933 connected to the switch 930. The hierarchical group H3b (921) is made up of a switch 940 and information processing equipment components 941 to 944 connected to the switch 940. The hierarchical group H3c (922) is made up of a switch 950 and information processing equipment components 951 and 952 connected to the switch 950. The hierarchical group H3d (924) is made up of switches 960, 962, and 964, and rack-type information processing equipment 961 and 963 and information processing equipment components 965 to 969 which are connected to the switches 960, 962, and 964. The hierarchical group H3e (925) is made up of switches 970 and 972, and information processing equipment components 971 and 973 to 975 connected to the switches 970 and 972. The hierarchical group H3*f* (926) is made up of information processing equipment components 980 to 984 which have a switch function.

According to an operation management method for the information processing system of the third embodiment, in the information processing system 900, where components are dispersed spatially and connected to one another via the wide area network 901 and local area networks 913 to 915, hierarchical control based on operating information of each hierarchical group is accomplished by configuring hierarchical groups the same way as in the preceding embodiments. This method can similarly be applied to the operation management of, for example, a datacenter dispersed over a wide area or a large-scale distributed system, and effects of this invention are brought out irrespective of the architecture of the information processing system.

What is claimed is:

1. An operation management method for an information processing system,
   the information processing system comprising:
      a plurality of information processing equipment components;
      a plurality of power feed equipment components for supplying power to the plurality of information processing equipment components; and
      a plurality of cooling equipment components for cooling the plurality of information processing equipment components,
   the plurality of information processing equipment components including a plurality of network equipment components,
   the plurality of information processing equipment components other than the plurality of network equipment components each comprising an interface, which is connected to one of the plurality of network equipment components, a processor, which is connected to the interface, and a memory, which is connected to the processor,
   the plurality of information processing equipment components other than the plurality of network equipment components including a management computer,
   the interface of the management computer being connected to the plurality of power feed equipment components and the plurality of cooling equipment components via the plurality of network equipment components,
   the information processing system having a plurality of groups defined therein, the plurality of groups each including at least one of the plurality of information processing equipment components,
   the plurality of groups each including at least one of the plurality of power feed equipment components that supply power to the information processing equipment components included in the group, and at least one of the plurality of cooling equipment components that cool the information processing equipment components included in the group,
   the management computer keeping, for each of the plurality of groups, configuration information which associates the information processing equipment components, the power feed equipment components, and the cooling equipment components that are included in the group with one another,
   the operation management method for an information processing system comprising:
      a first step of obtaining, by the management computer, for each of the plurality of groups separately, operating information which indicates performance and power consumption of the information processing equipment components, the power feed equipment components, and the cooling equipment components that are included in the group; and
      a second step of controlling, by the management computer, based on the operating information, the information processing equipment components, the power feed equipment components, and the cooling equipment components that are included in the group in a manner that enhances the performance relative to the power consumption.

2. The operation management method for an information processing system according to claim 1,
   wherein the plurality of groups include a plurality of first hierarchy level groups each of which includes at least one of the plurality of information processing equipment components, and second hierarchy level groups above the first hierarchy level, and
   wherein the second hierarchy level groups each include a plurality of first hierarchy level groups.

3. The operation management method for an information processing system according to claim 2,
   wherein the plurality of network equipment components include first network equipment components and second network equipment components, and the plurality of power feed equipment components include first power feed equipment components and second power feed equipment components,
   wherein the plurality of first hierarchy level groups each include the first network equipment components that are connected to the plurality of information processing equipment components within the first hierarchy level group, and include the first power feed equipment components that supply power to the plurality of information processing equipment components within the first hierarchy level group,
   wherein the second hierarchy level groups each include the second network equipment components and the second power feed equipment components that supply power to the plurality of first power feed equipment components within the second hierarchy level group, and
   wherein, in each of the second hierarchy level groups, the second network equipment components included in the second hierarchy level group are connected to the first network equipment components that are included in the first hierarchy level groups within the second hierarchy level group.

4. The operation management method for an information processing system according to claim 3, wherein the second step comprises:
   a third step of controlling, for each of the plurality of groups separately, operation allocation to the information processing equipment components in a manner that enhances the performance of the information processing equipment components relative to the power consumption of the information processing equipment components; and
   a fourth step of controlling the power feed equipment components and the cooling equipment components in a manner that reduces power dissipation of the power feed equipment components relative to the power consumption of the information processing equipment components, and that reduces power consumption of the cooling equipment components relative to the power consumption of the information processing equipment components.

5. The operation management method for an information processing system according to claim 4, wherein the third step comprises a step of allocating an operation to, out of the plurality of first hierarchy level groups included in each second hierarchy level group, the first hierarchy level group that is the highest in the performance of the information processing equipment components relative to a sum of the power consumption of the information processing equipment components, the power dissipation of the power feed equipment components, and the power consumption of the cooling equipment components.

6. The operation management method for an information processing system according to claim 4, wherein the third step comprises a step of controlling operation allocation to the information processing equipment components so that the operation allocation to the information processing equipment components does not violate predetermined conditions.

7. The operation management method for an information processing system according to claim 3, wherein the second step comprises a fifth step of controlling, for each of the plurality of groups, based on the operating information, the information processing equipment components included in the group so that the power consumption of the information processing equipment components does not exceed power capacity of the power feed equipment components included in the group and cooling capacity of the cooling equipment components included in the group.

8. The operation management method for an information processing system according to claim 7, wherein, when it is determined that the power consumption of the information processing equipment components that are included in a first group out of the plurality of groups exceeds at least one of the power capacity of the power feed equipment components included in the first group and the cooling capacity of the cooling equipment components included in the first group, the fifth step comprises executing at least one of:
a sixth step of newly adding to the first group at least one of the power feed equipment components and the cooling equipment components;
a seventh step of changing the operation allocation so that an operation that has been allocated to the information processing equipment components included in the first group shifts to groups other than the first group;
an eighth step of lowering the power consumption of the information processing equipment components included in the first group by lowering the performance of the information processing equipment components; and
a ninth step of reducing operations that have been allocated to the information processing equipment components included in the first group.

9. The operation management method for an information processing system according to claim 8, wherein the seventh step comprises a step of searching the plurality of groups sequentially from the highest hierarchy level groups that include the first group to the groups below the highest hierarchy level groups, and determining whether or not operations that have been allocated to the information processing equipment components included in the first group can be shifted to the searched groups.

10. The operation management method for an information processing system according to claim 8, wherein the seventh step comprises a step of sequentially searching the groups that are on the same hierarchy level as the first group, and determining whether or not operations that have been allocated to the information processing equipment components included in the first group can be shifted to the searched groups.

11. The operation management method for an information processing system according to claim 8, wherein the seventh step comprises a step of sequentially tracing up and searching the groups above the first group in hierarchy, sequentially searching the higher hierarchy level groups that include the first group, and the lower hierarchy level groups below the higher hierarchy level groups, and determining whether or not operations that have been allocated to the information processing equipment components included in the first group can be shifted to the searched groups.

12. The operation management method for an information processing system according to claim 1,
wherein the operating information comprises information indicating allocation of operations to the plurality of groups, and
wherein the first step comprises a step of obtaining the performance and the power consumption for each of the allocated operations, and the second step is executed based on the performance and the power consumption of each operation.

13. The operation management method for an information processing system according to claim 2,
wherein the first hierarchy level groups each correspond to a rack, which comprises the plurality of information processing equipment components, a rack row which comprises a plurality of the racks, a partition on a floor which comprises a plurality of the rack rows, or a floor which comprises a plurality of the partitions,
wherein, when the first hierarchy level group corresponds to the rack, the first network equipment components are each a top-of-rack network equipment component, the first power feed equipment components are each a breaker, a distribution unit, or a power supply unit that is associated with the rack, the cooling equipment components in the first hierarchy level group are each a local cooling equipment component that cools an interior of the rack, and the second hierarchy level groups each correspond to the rack row or the partition,
wherein, when the first hierarchy level group corresponds to the rack row, the first network equipment components are each an end/middle-of-row network equipment component, the first power feed equipment components are each a panelboard that is associated with the rack row, the cooling equipment components in the first hierarchy level group are each a local cooling equipment component that cools the rack row, and the second hierarchy level groups each correspond to the partition,
wherein, when the first hierarchy level group corresponds to the partition, the first network equipment components are each an end/middle-of-row network equipment component, the first power feed equipment components are each a switchboard that is associated with the partition, the cooling equipment components in the first hierarchy level group are each an air-conditioner that cools the partition, and the second hierarchy level groups each correspond to the floor, and
wherein, when the first hierarchy level group corresponds to the floor, the first network equipment components are each a core network equipment component connected to a network outside the information processing system, the first power feed equipment components are each a transformer or an uninterruptible power-supply system that is associated with the floor, the cooling equipment components in the first hierarchy level group are each a chiller that cools a refrigerant used by the air-conditioner, and the second hierarchy level groups each correspond to a building that includes a plurality of the floors.

14. An information processing system comprising:
a plurality of information processing equipment components;
a plurality of power feed equipment components for supplying power to the plurality of information processing equipment components; and
a plurality of cooling equipment components for cooling the plurality of information processing equipment components,
the plurality of information processing equipment components including a plurality of network equipment components,
the plurality of information processing equipment components other than the plurality of network equipment components each comprising an interface, which is connected to one of the plurality of network equipment components, a processor, which is connected to the interface, and a memory, which is connected to the processor,
the plurality of information processing equipment components other than the plurality of network equipment components including a management computer,
the interface of the management computer being connected to the plurality of power feed equipment components and the plurality of cooling equipment components via the plurality of network equipment components,
the information processing system having a plurality of groups defined therein, the plurality of groups each including at least one of the plurality of information processing equipment components,
the plurality of groups each including at least one of the plurality of power feed equipment components that supply power to the information processing equipment components included in the group, and at least one of the plurality of cooling equipment components that cool the information processing equipment components included in the group,
the management computer being configured to:
keep, for each of the plurality of groups, configuration information which associates the information processing equipment components, the power feed equipment components, and the cooling equipment components that are included in the group with one another;
obtain, for each of the plurality of groups separately, operating information which indicates performance and power consumption of the information processing equipment components, the power feed equipment components, and the cooling equipment components that are included in the group; and
control, based on the operating information, the information processing equipment components, the power feed equipment components, and the cooling equipment components that are included in the group in a manner that enhances the performance relative to the power consumption.

* * * * *